US012380282B2

(12) United States Patent
Leary et al.

(10) Patent No.: US 12,380,282 B2
(45) Date of Patent: Aug. 5, 2025

(54) NATURAL LANGUAGE PROCESSING APPLICATIONS USING LARGE LANGUAGE MODELS

(71) Applicant: Nvidia Corporation, Santa Clara, CA (US)

(72) Inventors: Ryan Leary, Woodstock, GA (US); Jonathan Cohen, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 244 days.

(21) Appl. No.: 17/947,946

(22) Filed: Sep. 19, 2022

(65) Prior Publication Data
US 2024/0095463 A1  Mar. 21, 2024

(51) Int. Cl.
*G06F 40/40* (2020.01)
*G06F 40/284* (2020.01)

(52) U.S. Cl.
CPC ............ *G06F 40/40* (2020.01); *G06F 40/284* (2020.01)

(58) Field of Classification Search
CPC .............................. G06F 40/40; G06F 40/284
USPC ............................................................. 704/9
See application file for complete search history.

(56) References Cited

U.S. PATENT DOCUMENTS

| 10,249,296 | B1* | 4/2019 | Mutagi | G10L 15/1822 |
| 12,008,341 | B2* | 6/2024 | Chen | G06F 8/33 |
| 2018/0349256 | A1* | 12/2018 | Fong | G06F 40/284 |
| 2019/0102390 | A1* | 4/2019 | Antunes | G06F 40/295 |

FOREIGN PATENT DOCUMENTS

| KR | 20230121164 A | * | 5/2021 |
| WO | WO-2024172911 A1 | * | 8/2024 |

OTHER PUBLICATIONS

Ly Pichponreay, Jin-Hyuk Kim, Chi-Hwan Choi, Kyung-Hee Lee and Wan-Sup Cho, "Smart answering Chatbot based on OCR and Overgenerating Transformations and Ranking," 2016 Eighth International Conference on Ubiquitous and Future Networks (ICUFN), Vienna, 2016, pp. 1002-1005, doi: 10.1109/ICUFN.2016.75369 (Year: 2016).*

M. Palmirani, R. Brighi and M. Massini, "Processing normative references on the basis of natural language questions," Proceedings. 15th International Workshop on Database and Expert Systems Applications, 2004., Zaragoza, Spain, 2004, pp. 9-12, doi: 10.1109/DEXA.2004.1333441. keywords: {Natural langua (Year: 2004).*

* cited by examiner

*Primary Examiner* — Bharatkumar S Shah
(74) *Attorney, Agent, or Firm* — Hogan Lovells US LLP

(57) ABSTRACT

Approaches presented herein can provide for the performance of specific types of tasks using a large model, without a need to retrain the model. Custom endpoints can be trained for specific types of tasks, as may be indicated by the specification of one or more guidance mechanisms. A guidance mechanism can be added to or used along with a request to guide the model in performing a type of task with respect to a string of text. An endpoint receiving such a request can perform any marshalling needed to get the request in a format required by the model, and can add the guidance mechanisms to the request by, for example, prepending one or more text strings (or text prefixes) to a text-formatted request. A model receiving this string can process the text according to the guidance mechanisms. Such an approach can allow for a variety of tasks to be performed by a single model.

20 Claims, 18 Drawing Sheets

NATURAL LANGUAGE PROCESSING APPLICATIONS USING LARGE LANGUAGE MODELS

BACKGROUND

Applications and implementations of natural language processing (NLP) techniques are commonly used for various tasks, such as language generation or analysis, grammar and usage checking, or content summarization, just to name a few. In order to provide highly accurate NLP results, it can be advantageous to use a large language model that has been trained using a very large training set for vocabulary and grammar. While a large language model (LLM) can be a very powerful universal tool for implementing a wide range of complex NLP algorithms, such a large model is computationally expensive, sometimes requiring many multi-processor servers or workstations to load and perform basic calculations, putting these models out of reach of many potential users. While an entity such as a cloud provider can host an LLM for use by various different users or entities, such an implementation may be sub-optimal. For example, for unique use cases or operations, a language model may need customization—which requires the model to be trained with some amount of additional data specifically relevant to that use case or operation. Even for large cloud providers, the size and computational expense of these models reduces the feasibility of training and hosting a different large model for each such use case or operation.

BRIEF DESCRIPTION OF THE DRAWINGS

Various embodiments in accordance with the present disclosure will be described with reference to the drawings, in which.

DETAILED DESCRIPTION

Figure 1:
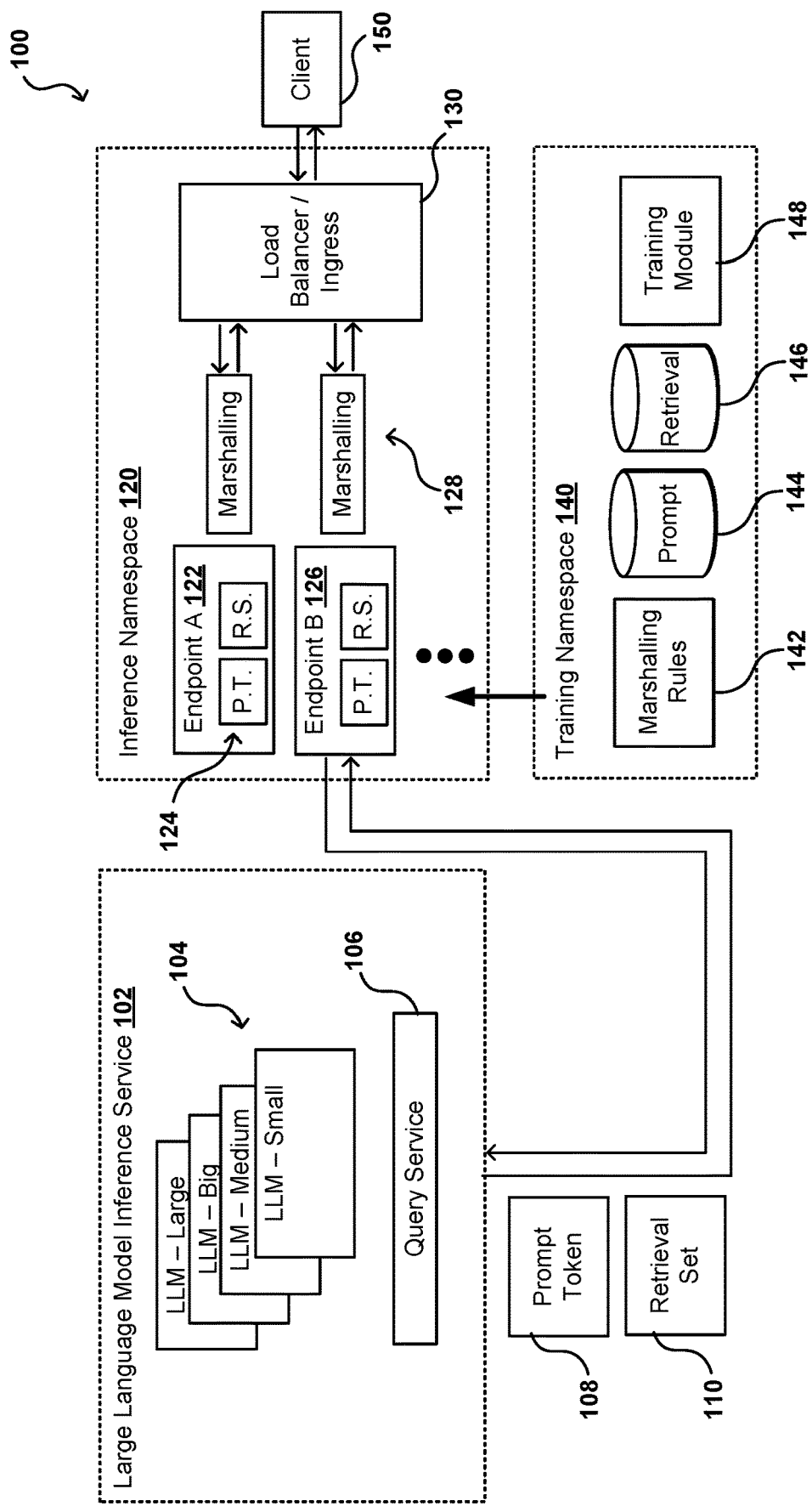
FIG. 1 illustrates an example language inferencing processing system that can be used in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments can provide for the use of large models for a variety of different tasks. In particular, various embodiments provide the ability to use a single large language model (LLM) for a variety of different natural language processing (NLP)-related inferencing tasks without a need to retrain the model or use multiple different, customized models. An inferencing service can be provided that enables the use of custom endpoints, and individual endpoints can be trained for a specific type of task—as may be indicated by the selection or providing of one or more "guidance mechanisms." A guidance mechanism can include any token, tag, weight, file, modifier, or other type of data object that can be added to, embedded in, or associated with a request to perform a specific operation, or type of operation, with respect to a string of text. Example guidance mechanisms include prompt tokens to indicate a type of operation to be performed, a retrieval set tag to indicate a data set to use for the operation, and/or an adaptor weight that can effectively modify operation or structure of the language model, among other such options. An endpoint receiving such a request can perform marshalling and/or other operations needed to get the request in a text format required by the language model, and can add the guidance mechanisms to the request by, for example, prepending one or more text strings (or text prefixes) to the text formatted request. In some embodiments, there may be differently-sized instances of a language model, and individual endpoints can be associated with, and trained for, one of these instances of a particular size, which can impact aspects such as the time and cost for performing inferencing for a given request. Once inferencing is performed using the model, the result (in the form specified by the prompt token) can be returned to the endpoint, where any marshalling and/or other processing can be performed to put the results in a necessary structure or format, and the result may be forwarded on to the intended recipient or destination. Such a global service can be used by a wide variety of different users, developers, and/or other entities who may each be able to generate custom endpoints for a variety of different use cases or types of operations. This heterogeneous set of tasks can be converted into a highly homogenous computation stream, or sequence of homogenous batches of tasks, that can be processed using a single large language model, which can be highly efficient and computationally cost effective.

Advantages of generating such representations can be obtained in various applications and for various use cases. These can include, by way of example and without limitation, use in conversational systems to understand the intention of what a person is saying so that a digital conversational agent could respond appropriately. This would apply broadly to any situation where a computer system is interacting with a human via verbal or written communication. Such approaches can also be used to analyze written documents or recordings of human speech to determine their meaning, structure, or for example to find grammatic errors or generate alternative phrasings. Such approaches can also be beneficial generating written or spoken content, for example in a video game, for marketing copy, or to be used in creative writing or business communications applications. Another application is to convert between different languages for example to translate from one language to another. Yet another application would be in the context of computer programming source code, for a system that automatically generates code to perform a given task, or analyzes a code to understand its structure, purpose, or to detect programming errors. These language-related operations can correspond to various types of applications or systems that may include one or more language-related tasks as well, as may relate to videoconferencing, image analysis, autonomous navigation, robotics, gaming and animation, and data processing, among other such options.

Variations of this and other such functionality can be used as well within the scope of the various embodiments as would be apparent to one of ordinary skill in the art in light of the teachings and suggestions contained herein.

FIG. 1 illustrates an example system 100 that can be used to perform a variety of language-based tasks or operations. In this example, a user or entity can use a client device 150 (or other computerized device or system) to make a call (or request or instruction) into system 100 for performing those tasks or operations. The call may include some amount of text to be processed, as well as specification of one or more tokens (or other objects or files) indicating a way in which that text is to be processed. In some embodiments, an endpoint that is selected to receive the request can be associated with these one or more tokens such that separate indication is not required. In this example, the text is to be processed using a large language model, which as described herein can be a powerful tool for performing text-based operations. The request from the client device 150 can be received to an environment such as a data center (or cloud computing environment or multi-tenant resource provider environment, etc.), in which shared resources are used to host one or more large language models 104. In this example, these large language models 104 may be provided as part of a large language model (LLM) inference service 102 hosted by resources in the datacenter. The client device 150 can call into an appropriate endpoint 122, 126 which can direct the text to a query service 106 that can cause the text query or operation to be performed using the appropriate LLM 104. A result of this processing, such as an inference generated by the respective LLM, can then be returned to the client device 150 or directed to another appropriate recipient or destination.

As mentioned, however, while large language models (LLMs) are very powerful universal tools for implementing a wide range of complex NLP algorithms, prior LLM-based approaches did not scale well due at least in part to their corresponding computational expense. As there will be various unique use cases and operations provided by various users, providing a single LLM in a prior system would not allow for accurate results due, at least in part, to an inability (or impracticality) in training and hosting multiple, independent LLMs for these various operations and use cases.

Accordingly, various embodiments of the present disclosure can present a system architecture for one or more large language models to be hosted in a datacenter and accessed as a service by various users, in a way that is flexibly customizable for various use cases and operations. Such architecture can also allow such deployment to be computationally efficient for a provider of the service. A system 100 such as that illustrated in FIG. 1 can include components such as an LLM inference service 102; one or more inference namespaces 120, such as one namespace for each developer, user, or entity; and a training namespace 140 for training endpoints for specific tasks, operations, or use cases.

An LLM inference service 102 can receive text-based requests and generate corresponding inferences. In at least some embodiments, where there are instances of the LLM at different sizes (which may come with different costs for usage), a request may specify a model to use, such as a smaller model that is (at least with respect to one or more of compute, memory, or storage requirements) less expensive to host or operate, and takes less time to perform a computation, but is best for use with simple inferencing tasks, or a "large" model that may be more expensive to operate but provides more robust inferencing capability. While four different size models are illustrated, there may be any number of LLM models 104 used of various different sizes. There may be other differences between model instances as well, as may relate to location or availability, among other such differences. A request or query received to a query service 106 of this inference service 102 can be directed to the appropriate model instance for inferencing, and a result returned (after any post-processing, aggregation, or other such operation) to the client device 150 or target destination.

As mentioned, different requests may be associated with different tasks, operations, or use cases. Instead of training and hosting different models for these various alternatives, this example system can allow individual requests to be associated with one or more tags, tokens, weights, and/or other objects or files that can help an inference service 102 determine how to best process the request or perform inferencing for the request. In this example, a request (at request or inference time) can be associated with one or more guidance mechanisms, such as at least one "prompt token" (PT), "retrieval set tag" (RST), or "adaptor weight" (AW), among other such options. In some embodiments there may be a fixed set of guidance mechanism types, such as three different types, but it is not required that any given request provide three different types. These guidance mechanisms can allow for various customization options, without changing the compute flow of an inference computation through the LLM. As discussed in more detail herein, individual guidance mechanisms can cause the LLM to return a different result, or type of result, such as a full sentence response, a true/false response, and/or a type of speech for each word in a text string, among other such options, which may be drawn from specific sets of knowledge or information. The way in which these mechanisms are processed allows the LLM instance to process the text input using the same inferencing process or computation, such that a single LLM can be used for all these customized requests. Further, multiple requests with the same or different mechanisms associated can be batched together for improved efficiency. Such an inferencing service 102 may host LLM instances of different sizes, such as with 1 billion, 5 billion, 40 billion, and 530 billion parameters, from small to large LLM instances 104.

In order to allow the same processing to be formed for requests with different guidance mechanisms associated, there may be various endpoints 122, 126 deployed, where individual endpoints may be associated with a different guidance mechanism, or combinations of guidance mechanisms. In at least some embodiments where there may be multiple users, developers, or entities using this system, there may be various inferencing namespaces 120 hosted that allow for per-user (or developer, etc.) namespaces of deployed endpoints. A given inference namespace 120 may contain all endpoints for receiving requests to perform inferencing using the hosted LLMs 104 of the inference service 102. These endpoints can be managed by a corresponding user or developer, for example, and in some instances may be exposed to other users or even the general public (e.g., exposed to the open Internet) for usage. Each endpoint 122, 126 can consist of a number of associated items or aspects, as may include a name, identifier, address, and/or uniform resource locator (URL), such as "/summarize_news_article". An endpoint might also include an indicator for the size of LLM to use for a request sent to this endpoint, as well as one or more associated inference parameters (e.g., number of samples or temperature). An endpoint can also include, or be associated with, one or more guidance mechanisms 124, such as a prompt token and retrieval set tag. In at least some embodiments, an endpoint may also be associated with a type of data marshalling 128 to be performed. In some embodiments, this may be an option provided to a user, developer, or entity creating the respective endpoint. A data marshalling selection can be made that can specify how to map from input fields with specific types (e.g., for structured language protocols such as JSON or Protobuf) into, and out of, the text strings to be processed by the LLMs. The marshalling may be performed using code executed within an endpoint, or may be performed by a process in communication with the endpoint. A request received from a client device 150 (or other such source) for a user can be received using a load balancer or ingress layer 130, which can direct the request to an appropriate endpoint 122, 126 in the namespace 120 associated with that user. For structured incoming requests, such as JSON requests received via a REST endpoint or Protobuf requests received by a GRPC endpoint, one or more marshalling components 128 or processes (which may be internal to the endpoint in some embodiments) can convert this structured request data into text, according to the marshalling rules 142 that were used during training and creation of that namespace 120 and/or endpoint. The request can also be bound to any associated guidance mechanism, such as a prompt token and retrieval set tag, and passed to the LLM inference service 102 for processing along with associated LLM parameters. An inference-based response from the LLM inference service can then be marshalled back into a format based on a respective structured language protocol (e.g., JSON or Protobuf) according to one or more output data marshalling rules, and returned to the client device 150 or otherwise sent to a target recipient or destination.

In order to provide an appropriate set of endpoints configured for a specific set of tasks for a user or developer, for example, such a system can also provide a tool, such as a developer studio, that can operate in a training namespace 140. A tool—such as a developer studio—can provide a set of workflows for training guidance mechanisms, such as prompt tokens 144 or adaptor weights, or for managing retrieval sets 146 referencing an LLM. One or more marshalling rules 142 may also be provided as discussed herein.

Training can involve specific training and evaluation data sets with a training module 148, with respect to a given language model, and can require specification of at least certain training hyper-parameters (e.g., learning rate or maximum number of training iterations). This training workflow can then perform a number of training iterations until an end criterion is satisfied, such as where a model converges, a loss value falls below an acceptable threshold, and/or all training data has been used, among other such options. A user can perform tasks such as training and evaluation for each guidance mechanism to be used for a given task.

Once customization and training has completed, the associated customization data can be published to a new endpoint in a corresponding inference namespace 120. The endpoint can have access controls or other mechanisms or configurations put in place, as may be provided as part of an endpoint management system. Such a developer tool can run in various locations, such as in the cloud, as part of an inferencing system, and/or on-premises at a user location, among other such options.

If this tool is provided as part of a hosted cloud service, the system may automatically recompute the prompt token or adaptor weight values from associated training data if the underlying LLM is updated, and redeploy the associated endpoint automatically. At any time, a user could download the associated guidance mechanisms and use them for inferencing with the associated LLM on-premises at a user location, without going through the inferencing namespace 120. A developer studio can also be configured to perform additional functionality to conserve processing time. For example, an endpoint can be trained for a given prompt token, result set tag, and/or adaptor weight, with respect to a small LLM. Since the training process would not require much additional processing when done together, the studio might also generate endpoints for the same guidance mechanisms but for other size LLMs, such as medium and large LLMs, or at least the next size larger LLM. Creating a new endpoint from scratch could take significant resources, such that there may be advantages in training and creating them together for different size model instances. A developer studio can also be configured to automatically generate updated endpoints for any update or modification of the respective language model.

Figure 2:
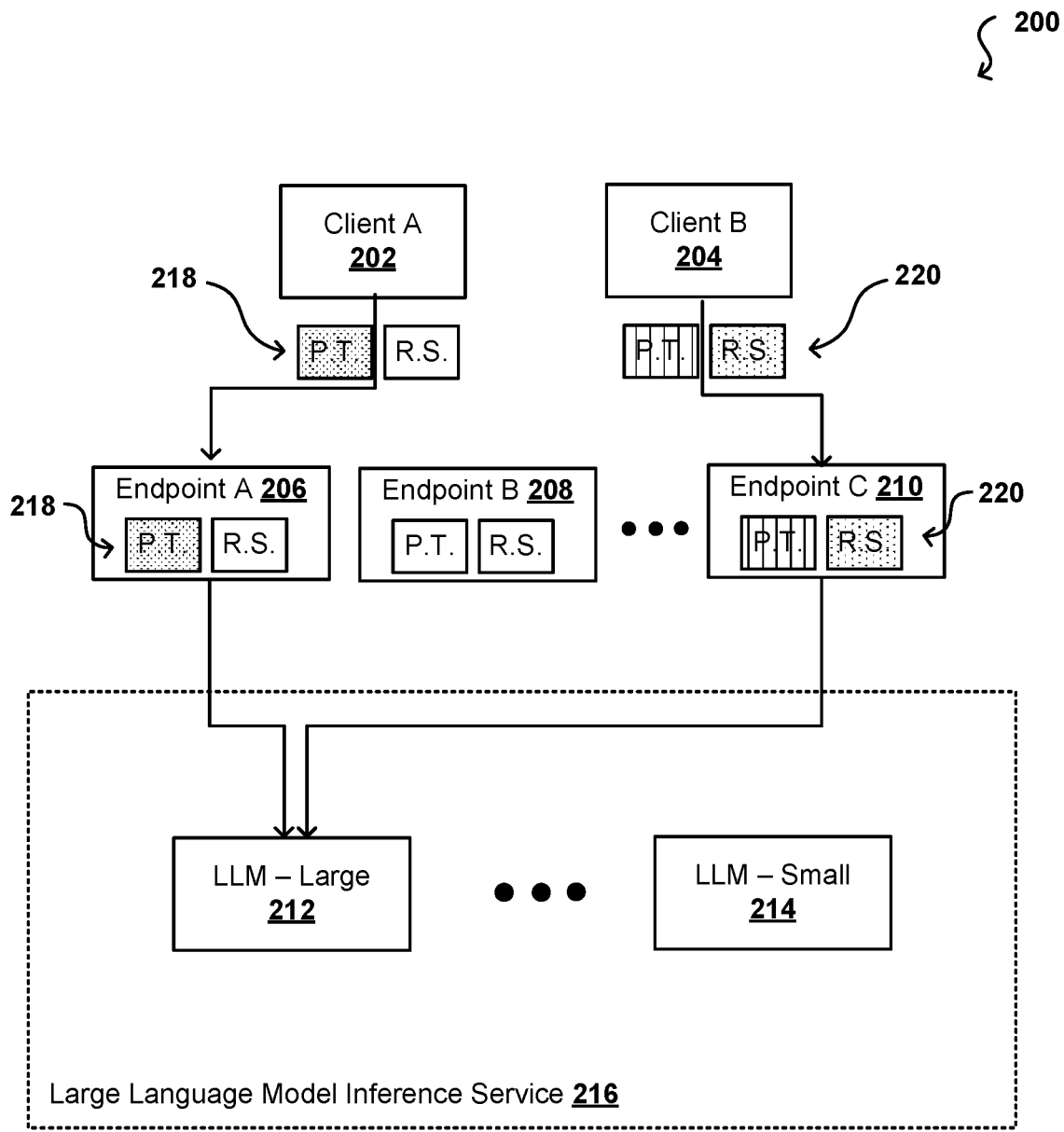
FIG. 2 illustrates calls directed to different endpoints and selecting different size language models, in accordance with various embodiments.

FIG. 2 illustrates example call flows in such a system 200. In this example, there are two different client devices 202, 204 that may be associated with the same entity or different entity, which may make calls into the same namespace or different namespaces as discussed with respect to FIG. 1. In some embodiments, there may also be a general or "public" namespace with common prompt tokens and/or publicly available retrieval sets that may be used by multiple different entities. In this example, client A 202 has a string of text to be processed using an LLM of an inference service 216. Based at least on an intended use for a result of the processing, the request can have one or more guidance mechanisms 218 associated with it, such as a specific prompt token to identify a type of result to be returned, as well as a retrieval set to identify the specific database that the LLM is to use to process the request. In this example, there will be a trained endpoint, here endpoint A 204, which is trained specifically for text that is associated with these particular guidance mechanisms 218. The endpoint can take any appropriate form, such as that of a REST endpoint. There will generally be other endpoints, such as endpoint B 208 which may be in the same namespace, that will not be called for this request because they have been trained for different guidance mechanisms. The endpoints may also correspond to different types, such that a subset of the endpoints may be REST endpoints and another subset might be another type of endpoint, whether in the same or different namespaces. The called endpoint, here endpoint A 206, can use these guidance tokens to transform the input request—which contained the text to be processed along with the associated guidance mechanisms—into a request that is in a format appropriate for processing by a general LLM of the inference service 216. In some embodiments a client may not call a specific endpoint buy may submit a request to a general interface or API, for example, which can analyze the request and direct the request to the appropriate endpoint. Each endpoint can also be associated with, or trained for, a specific size LLM, such that endpoint A 206 can be trained, configured, or customized to send this formatted string to the LLM inference service 216 to be processed by a large LLM 212. A result of the inferencing in this example can be returned via endpoint A 206 to client A 202, although in other examples the result may be passed through a different endpoint or sent to a different (or additional) recipient or destination. Although not shown, a result of the processing may also be stored by, or for, the LLM inference service for use in further training of the LLM models.

As illustrated, a separate client device B 204 can submit a request including text to be processed and a different set of guidance mechanisms 220, which will then be directed to a different endpoint C 210 that is associated with those guidance mechanisms. If client B 204 and client A 202 are associated with a single entity, then these endpoints 206, 208, 210 may all be associated with a single namespace, but if not then at least endpoint A 206 and endpoint C 210 can be in different namespaces. In this example endpoint C 210 then directs the formatted request to a target LLM, which could be any of the LLMs, such as a small LLM 214 as discussed, but in this example is also directed to a large LLM 212, as a single LLM model can be shared by multiple different entities for multiple different types of natural language processing (or other such) tasks. The result can be passed back through endpoint C 210 (or another endpoint) and back to client device B 204 and/or another target destination or recipient. Although not illustrated in FIG. 2, the endpoints (or a process in communication with the endpoints) can also perform marshalling as discussed with respect to FIG. 1, wherein a request received from a client may be in a structured format, such as JSON, which can be converted to text in order to generate a text request to be provided to the LLM, and a response received back from the LLM (and inference service) can be in a text format, which can also go through a marshalling process such that a response received back to the requesting client device is in the appropriate structured format.

In at least one embodiment, a prompt token can be used to provide guidance or instruction as to how associated text is to be processed. A prompt token can take the form of a series of numbers that can be prepended to (or otherwise inserted in or after) the input request text string. The series of numbers (or alphanumeric characters) may not be human-understandable, but can provide guidance as to how the following text in the string should be processed. The text string may be a sentence in natural language (e.g., in American English). Regardless of the type of processing to be used, the input to the LLM can be a natural language text string prepended by an alphanumeric sequence-type prefix indicating a type of inferencing to be performed or type of response to be returned.

Figure 3:
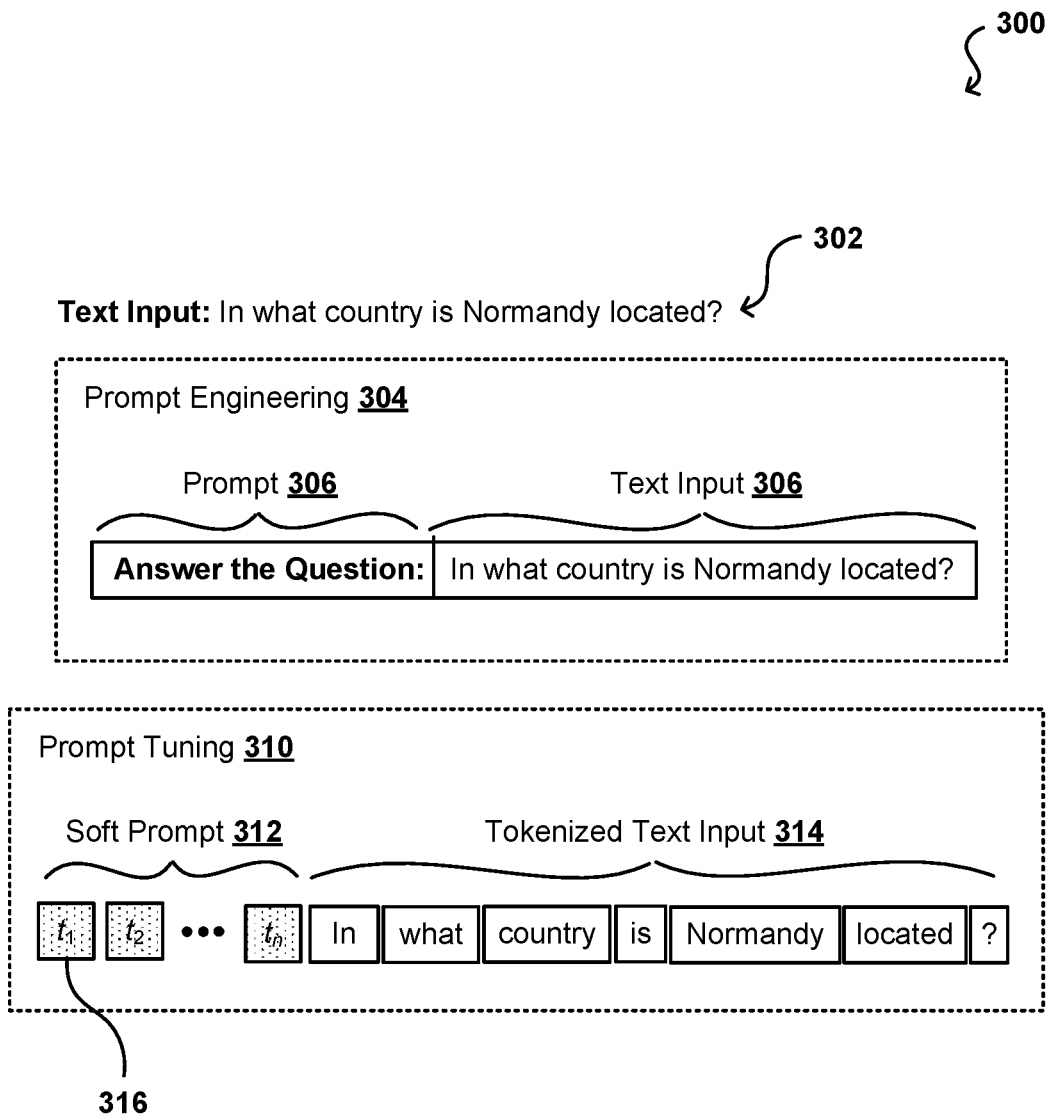
FIG. 3 illustrates an example of prompt engineering and tuning, according to at least one embodiment.

FIG. 3 illustrates example stages 300 in the training and/or generation of an example prompt token. In this example, a training text input string 302 is provided, here posing the question "In what country is Normandy located?" During a prompt engineering stage 304, a prompt token is generated that corresponds to the instruction "Answer the question". Although the prompt is shown here in human-understandable text, it should be understood that in many instances the prompt token will take the form of an alphanumeric string that may not be human understandable. During a training process, a prompt token generator can analyze training data associated with this type of task, such as input text and a corresponding prompt token, to learn to generate an appropriate prompt token to accomplish the target task. As mentioned, there can be one prompt token stored for, or associated with, each endpoint, which in at least some embodiments can each be a respective API. In addition to generating a representative string to serve as the prompt token, the prompt engineering stage 304 can also determine and store routines for extracting the result from generated text.

The prompt in this example can also go through a prompt tuning stage 310. A prompt tuning stage can involve any process that attempts to improve the results of the inferencing by the LLM, which is "frozen" or fixed and generally cannot be customized for a given task, by improving the quality of the prompt token and associated processes so a more accurate result can be obtained for a specific task. In this example, the input task can be tokenized 314 in order to analyze the component parts in more granular fashion, as well as in its entirety, which may help to generate one or more "soft" prompt tokens 312. An individual soft prompt token 316 may modify something about a primary prompt token, or a set of soft prompt tokens 312 may be used in place of a single prompt token 306. Soft prompt tokens 312 can take the form of virtual tokens that can each indicate a more specific instruction. Instead of simply instructing an LLM to answer the question, a soft token might instruct a way in which to answer, an emotional state to try to convey, a form of the answer, and/or so forth. These prompts can take various forms, such as text prompts, learned embeddings from prompt tuning, and/or a learned prompt model in some embodiments. Returned results may be in specified forms, as indicated by the guidance tokens, such as a single Boolean value, text in a structured format, multiple responses—such as for types of speech of each word in an input text string, and so forth. In some embodiments, results may also provide a determination made with respect to input text, such as a sentiment expressed by a movie review.

Since the LLM only speaks text, any instructions provided also have to be in text format. A prompt token can take the form of a prefix in text that provides some instruction, or "guidance," as to the inferencing to be performed. As mentioned, this can be to instruct the model to answer the question in a true/false manner, infer a sentiment of the text, determine whether a sentence is logical, extract a specific type of information (e.g., name, address, or title if present), summarize a paragraph, propose a subject line for a body of text, or answer a question using a library specified by a retrieval set tag, among other such options. An LLM can be thought of as a model that understands natural language, and can be asked to do a number of different things as long as the request is also in that natural language and the model has been trained such that it can understand the request. During training, a model can evaluate examples of the type of task that is to be performed, and can generate a sequence of numbers (or alphanumeric characters) that can be based upon a computer- or network-understandable language or syntax, which can be understood by the model. Results from the model can be evaluated, and if the results are not accurate or of a type desired then further training can be performed to attempt to refine the instruction string used for the prompt token. A process such as P-tuning can be used to refine this token.

An adaptor weight, as with other guidance mechanisms, can be inserted into the text of the request to be sent to the inference service or language model, such as by prepending to the text string to be processed. In some embodiments, guidance mechanisms are to be attached in a particular order, while in other embodiments the ordering may not be fixed but individual guidance mechanisms can include an indicator (e.g., a unique code or symbol) that identifies a portion of the text string that corresponds to a specific guidance mechanism. An adaptor weight can function as a perturbation of the activations of the LLM, which can cause the LLM to return different types of results for different request with different adaptor weights. An adaptor weight can be thought of as an adjustment to one or more of the network weights, which can effectively cause the network to perform inferencing in a slightly different way without having to perform retraining to adjust the relevant network weight(s). A training process, such as that discussed with respect to FIG. 1, can be used to determine the appropriate adaptor weight for a given task, that is to be associated with a respective endpoint. An example adaptor weight could indicate that an extra layer of processing should be performed between two layers of a model, such as between layer 37 and 38, with specific weights or activations. Such an approach can effectively modify operation of the model without a need for retraining.

A retrieval set tag can be used to specify a database, dictionary, library, or other set of data or facts to be used for a specific inferencing task associated with an endpoint. An advantage to the use of such a tag is that it can allow a language model to use data other than was used to train the model, which can effectively expand the capability of the model without needing to retrain on this data. Two different requests can point to two different databases with different sets of facts, such that the model might answer the same exact question with two different answers. Other than the database lookup, everything else related to these requests can be computationally equivalent or homogeneous, which helps to make this process highly efficient. The format of the retrieval set can vary, as long as the data is in a text format that is understandable to, and accessible by, the relevant language model or inferencing service. In some embodiments, there may be some amount of pre-processing performed where data is extracted from a database or fact set indicated by a retrieval set tag, and the data is formatted and indexed into a specified format to be provided as input to the language model. Such an approach can enable the database specified to be more varied in structure or form, as long as the data itself can be placed in a single format for use by the language model. In some embodiments, pre-processing may effectively index the fact set and provide that index to the model, among other such options, so that the internal layers of the language model or network can access those facts (or documents, etc.) that are identified via the index. Different data sets can be appropriate for specific tasks, as a database of legal terms would be useful for a different task than a set of recipes, and it would generally not be of any benefit to combine these facts into a single database, which would then either become excessively large or would need to reduce the number of facts of any given type to be practical, which would lessen the quality of the results. In some instances, there could be four different endpoints that are otherwise the same except that they use, and are trained or customized for, different fact sets.

Figure 4:
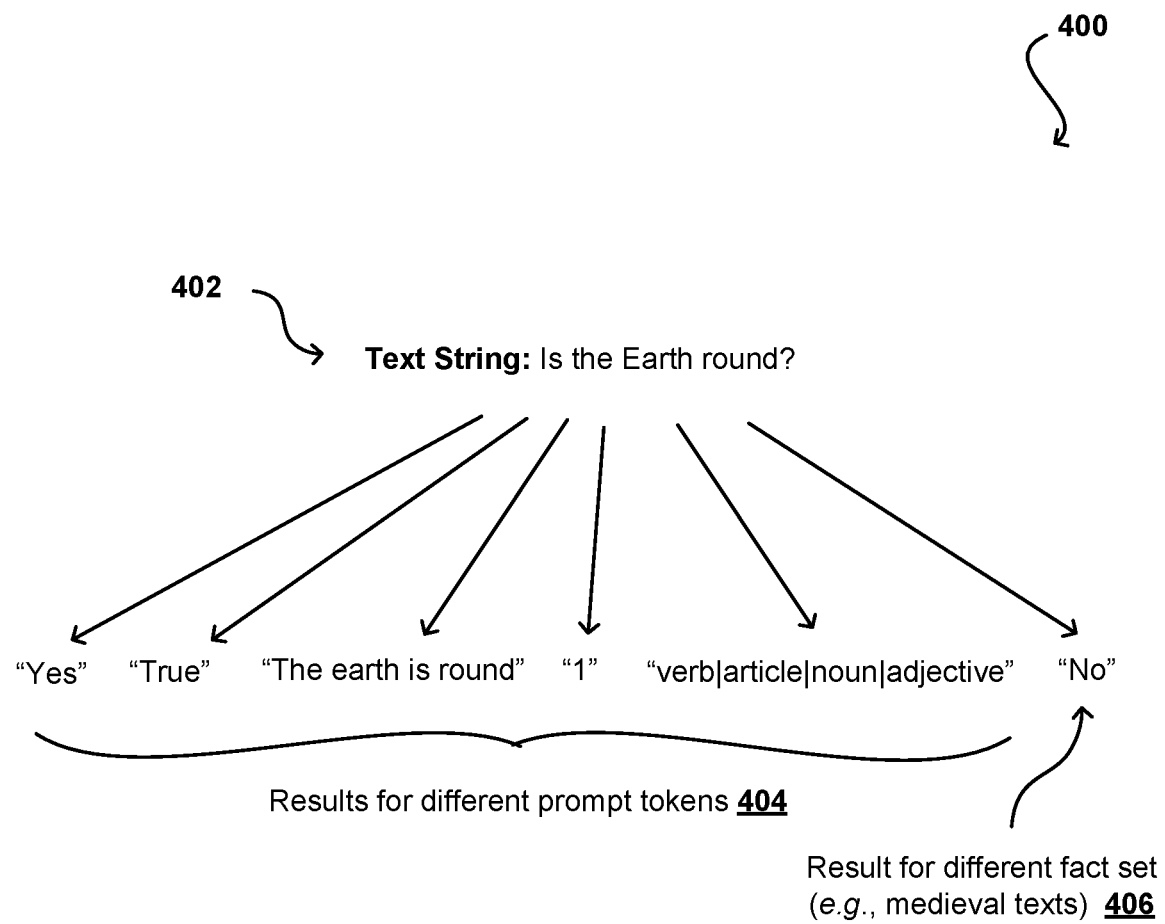
FIG. 4 illustrates different inferencing results for different guidance mechanisms, according to at least one embodiment.

FIG. 4 illustrates a set of different types of inferencing results 400 that could be returned for the same text string, using the same language model, but using different custom endpoints. It should be understood that while "endpoints" are used as a primary example herein, there can be any number of ways to cause specific or custom processing to be applied to incoming request using various models, rules, identifiers, interfaces, and/or other such options, such that "endpoints" (whether Rest or otherwise) should not be viewed as a limitation on the scope of the various embodiments. In this example, a single text string 402 can be received to multiple different endpoints that can be associated with different guidance mechanisms, or combinations of guidance mechanisms. As illustrated, different types of results 404 can be returned through use of different prompt tokens, or other such guidance mechanisms. In this example, for the text string "Is the Earth round?", the results could have similar content but in different form, such as "Yes" for a yes/no result, "True" for true/false, "The earth is round" for an "answer the question in natural language" result, or "1" for a binary I/O result. Another result for a different prompt token returns the parts of speech of the text string, at least as identified using a specific definition set. Another result shows the difference in result based on specifying a fact set, as a modern fact set might return a "Yes" answer if asked if the Earth is round, but if someone is determining responses based on a fact set, such as medieval European religious texts, then the result 406 might be "No" for a yes/no result, as that is the correct answer according to that specific fact set. As illustrated, a single large language model can be guided to return very different results through the use of different guidance mechanisms.

Such an approach can enable multiple users to effectively customize performance of a model, such as an LLM, without actually modifying or retraining the model. These users can instead use customized endpoints that can format text processing requests, through the use of one or more guidance mechanisms, such that the LLM knows how to handle this specific request to perform a specific operation or type of task. Such a model can then be used concurrently by multiple different users to perform multiple different types of tasks. As mentioned, for efficiency purposes, these similarly formatted requests can also be batched together for transmission and processing, even though they may correspond to different types of tasks to be performed, or results to be provided. The operation performed by the LLM may not change as a result of these guidance mechanisms, such that a single model can be used that performs the same (or similar) computation without retraining or customization, unless desired for improvement over time or another such purpose. For example, if a retrieval set tag indicates to use a specific database then the model will perform a slightly different computation. It may be possible, however, to reduce tens of thousands of customized requests into a single computation, or small set of computations (e.g., 2-10), to be performed. In essence, such a system or service in accordance with at least one embodiment can take in a heterogeneous set of tasks that can be converted into a homogeneous computation string that can be processed by a single model, or instances of the same model, which can make this system or service much more efficient and computationally cost effective.

Figure 5:
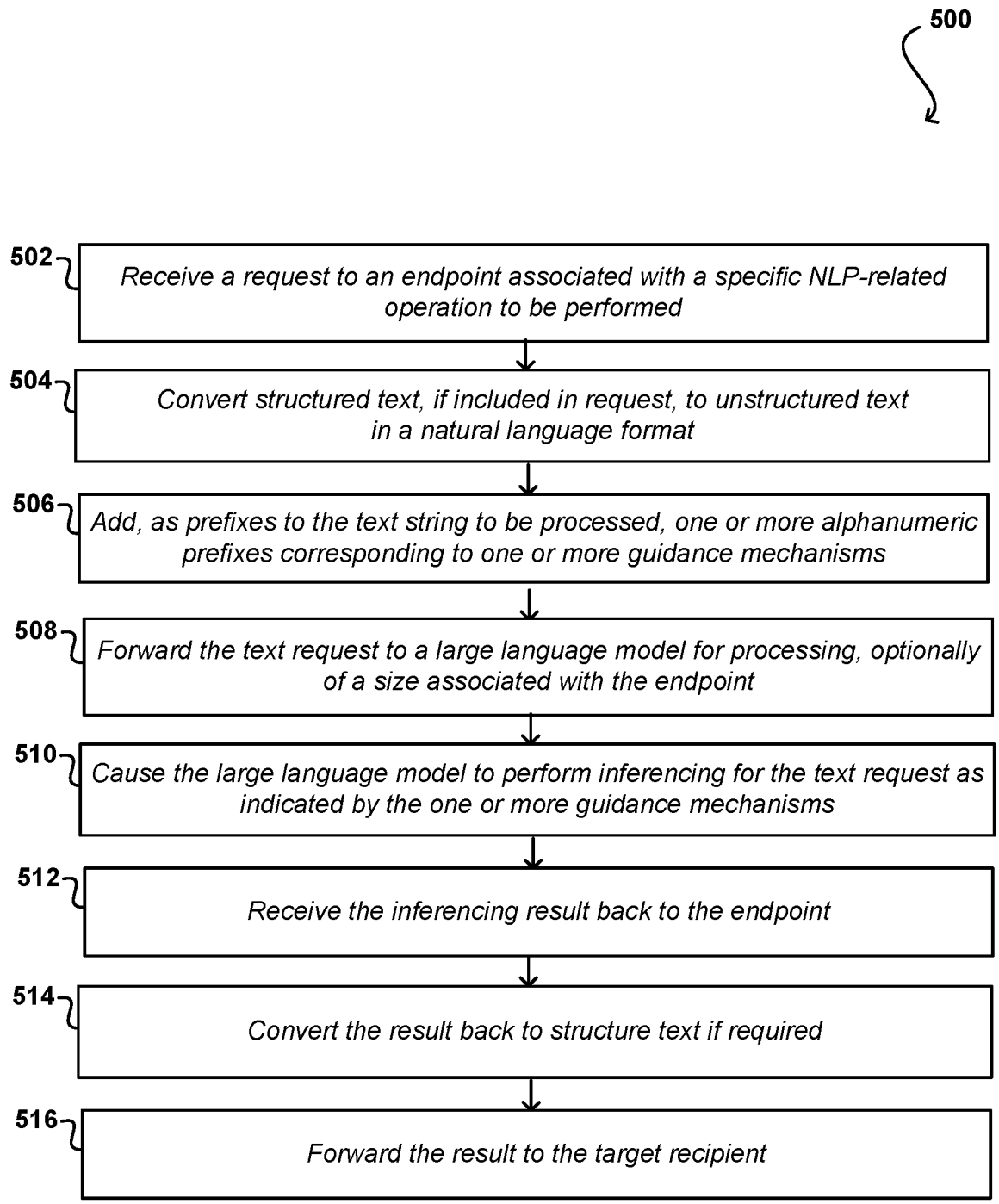
FIG. 5 illustrates an example process for performing custom inferencing using a global model, according to at least one embodiment.

FIG. 5 illustrates an example process 500 for causing a large language model to perform a custom inferencing task that can be performed in accordance with various embodiments. It should be understood that for this and other processes discussed herein, there can be additional, fewer, or alternative operations performed in similar or alternative orders, or at least partially in parallel, within the scope of the various embodiments unless otherwise specifically stated. In this example, a request is received 502 to an endpoint that is associated with a specific natural language processing (NLP)-related operation, such as a specific inferencing task to be performed to return a specific type of result. The request in this example may include structured text, such as text in a JSON or similar format. Structured text, if present, can be converted 504 into unstructured text in a natural language format (or other text format used by the target language model), such as by using a marshalling/unmarshalling process specific to that endpoint. The endpoint can also add 506, as prefixes (or other additions) to the text string to be processed, one or more alphanumeric prefixes corresponding to one or more guidance mechanisms. As discussed herein, this can include adding one or more alphanumeric strings that instruct or modify operation of the large language in some way to obtain a specific type of inferencing result. This text request can be forwarded to a large language model (or inferencing service hosting the model, for example) for processing or inferencing, where the model to which the request is forwarded may be an instance of a specific size that is associated with the endpoint. The large language model can then be caused 510 to perform inferencing for the text string in the request as indicated by the one or more guidance mechanisms. The inferencing result can then be received 512 back to the endpoint, which can convert 514 the text back to a structured format if required. The result can then be forwarded 516 to a target recipient or destination for the result, which may be different than or the same as a source of the request. As mentioned, in some embodiments this request may be batched with other requests, or added to a single result stream, which can help to improve operational efficiency.

Figure 6:
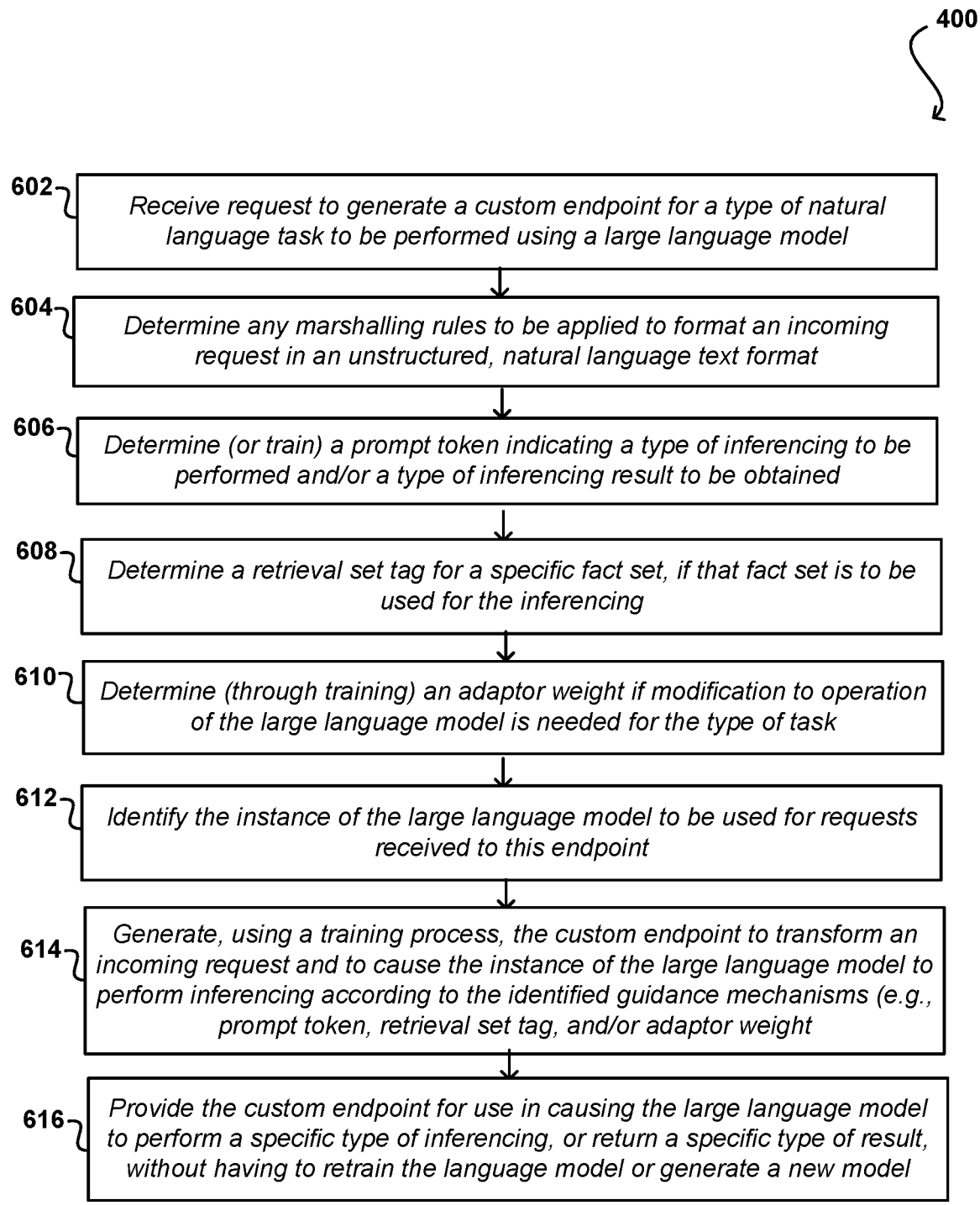
FIG. 6 illustrates an example process for generating a custom endpoint for a specific type of task to be performed, according to at least one embodiment.

FIG. 6 illustrates an example process 600 for generating a task-specific endpoint for a trained model that can be performed in accordance with various embodiments. In this example, a request is received 602 (to a developer studio or other such system or service) to generate a custom endpoint for a type of natural language task to be performed using a large language model. For the endpoint, a number of operations can be performed which are illustrated in sequence but can also be performed concurrently or in other orders as appropriate. In one operation, it can be determined 604 whether there are any marshalling rules (or other formatting or processing rules) to be applied in order to format an incoming request in a target format for a language model, such as an unstructured natural language format. Other formats or rules may be used for other types of models or tasks. For the given type of task, a prompt token can be determined 606 that can indicate the type of inferencing to be performed and/or a type or result to be returned. In some instances, this may involve a generation and/or training process that may provide a token that can guide the language model in performing the target task. The prompt token can take any of a number of different forms, but for a language processing model can take the form of an alphanumeric string providing code that the language model can understand in order to perform the target type of task. If a specific fact set is to be used for the task, a retrieval set tag can be determined 608 that can indicate to the model which fact set is to be used for the inferencing. As mentioned, such a tag does not impact the processing to be performed, but instead indicates the set of data or content from which the model should pull when performing the inferencing, such as to determine an answer to a question. During this training process, it may also be learned that some minor modification of the operation of the language model is required, or at least advantageous, where that modification can be performed through the introduction of one or more adaptor weights, which can effectively modify one or more network weights or network layers of the model. If so, these weights can be determined 610 or learned through the training process and provided for use in generating the endpoint. In some instances, there will be a specific model, type of model, and/or size of model for which the endpoint is being trained, and if so, this model can be identified 612 so that the endpoint is trained to work with that particular model instance. With this information, a custom endpoint can be generated 614 during this training or generation process that can transform an incoming request according to the provided marshalling (or other) rules and cause the indicated instance of the language model to perform inferencing according to the identified guidance mechanisms—such as by prepending text strings for the guidance mechanisms to a request produced by the custom endpoint. The custom endpoint can then be provided 616 for use in causing a large language model (or other such model or network) to perform a specific type of inferencing, or to return a specific type of result, without having to retrain the language model or generate a new model. The endpoint may be deployed to a namespace that is associated with an entity that generated the endpoint in at least some embodiments.

As discussed, various approaches presented herein are lightweight enough to execute on a client device, such as a personal computer or gaming console, in real time or near real time. Such processing can be performed on content that is generated on that client device or received from an external source, such as streaming content received over at least one network. The source can be any appropriate source, such as a game host, streaming media provider, third party content provider, or other client device, among other such options. In some instances, the processing and/or rendering of this content may be performed by one of these other devices, systems, or entities, then provided to the client device (or another such recipient) for presentation or another such use.

Figure 7:
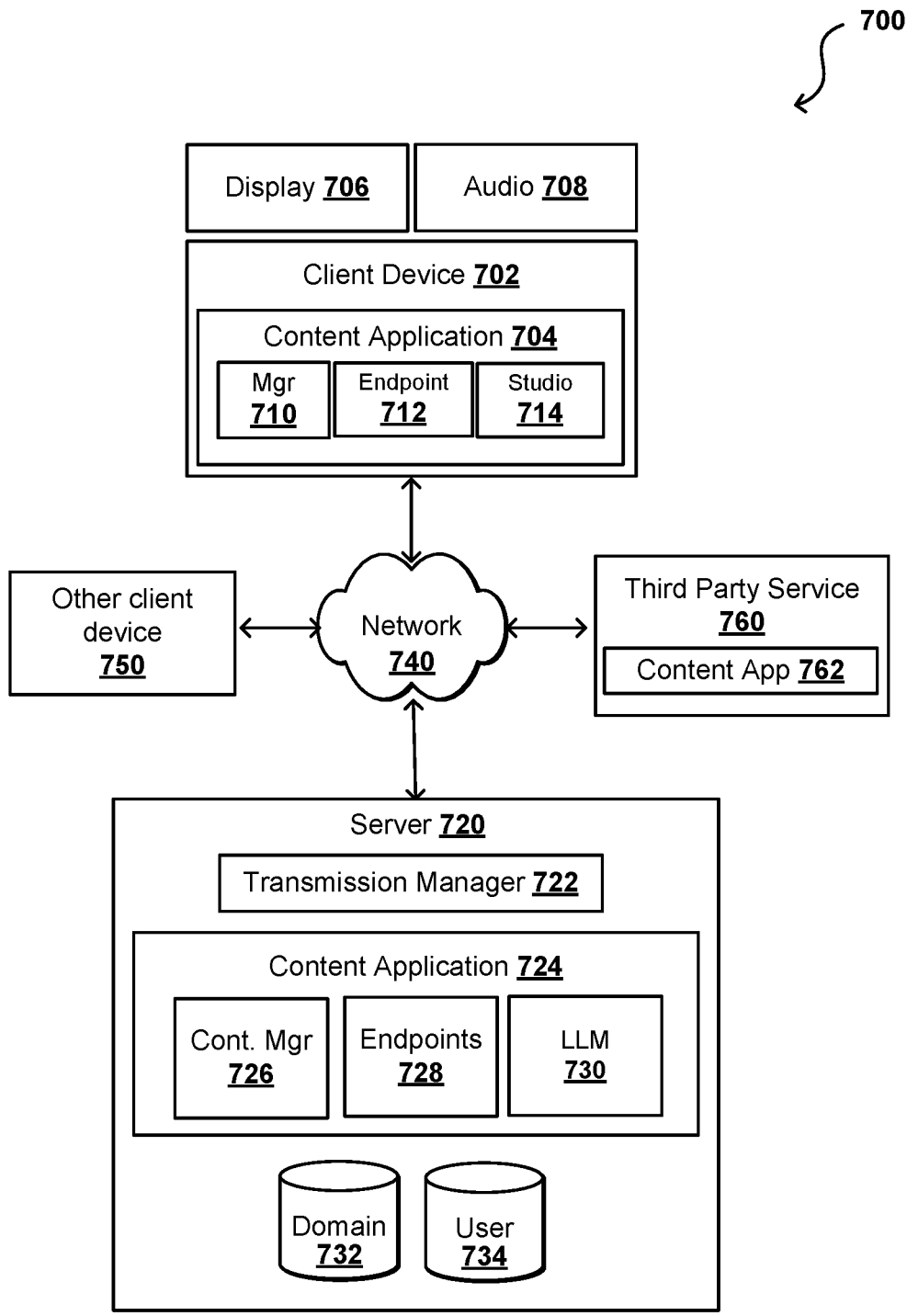
FIG. 7 illustrates components of an example distributed system that can be used to determine and/or perform tasks, according to at least one embodiment.

As an example, FIG. 7 illustrates an example network configuration 700 that can be used to provide, generate, modify, encode, and/or transmit content. In at least one embodiment, a client device 702 can generate or receive content for a session using components of a content application 704 on client device 702 and data stored locally on that client device. In at least one embodiment, a content application 724 (e.g., a text processing application) executing on content server 720 (e.g., a cloud server or edge server) may initiate a session associated with at least client device 702, as may use a session manager and user data stored in a user database 734, and can cause content 732 to be determined by a content manager 726. A content generation or management application 726 can generate or receive requests to perform NLP-related processing, which can be passed to a large language model 730 for processing, as may be provided through an inferencing service hosted using resources on the server. In some embodiments, the request can be directed to a custom endpoint 728 that is associated with a specific type of task, which can then be performed by the model. At least a portion of the generated content (e.g., a result of the inferencing or data for a custom endpoint) may be transmitted to client device 702 using an appropriate transmission manager 722 to send by download, streaming, or another such transmission channel. An encoder may be used to encode and/or compress at least some of this data before transmitting to the client device 702. In at least one embodiment, client device 702 receiving such content can provide this content to a corresponding content application 704, which may also or alternatively include a content manager 710, custom endpoint 712, or developer studio 714 for use in generating custom endpoints, among other such options. A decoder may also be used to decode data received over the network(s) 740 for presentation via client device 702, such as image or video content through a display 706 and audio, such as sounds and music, through at least one audio playback device 708, such as speakers or headphones. In at least one embodiment, at least some of this content may already be stored on, rendered on, or accessible to client device 702 such that transmission over network 740 is not required for at least that portion of content, such as where that content may have been previously downloaded or stored locally on a hard drive or optical disk. In at least one embodiment, a transmission mechanism such as data streaming can be used to transfer this content from server 720, or user database 734, to client device 702. In at least one embodiment, at least a portion of this content can be obtained or streamed from another source, such as a third party service 760 that may also include a content application 762 for generating or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, MR headset/goggles wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 8A:
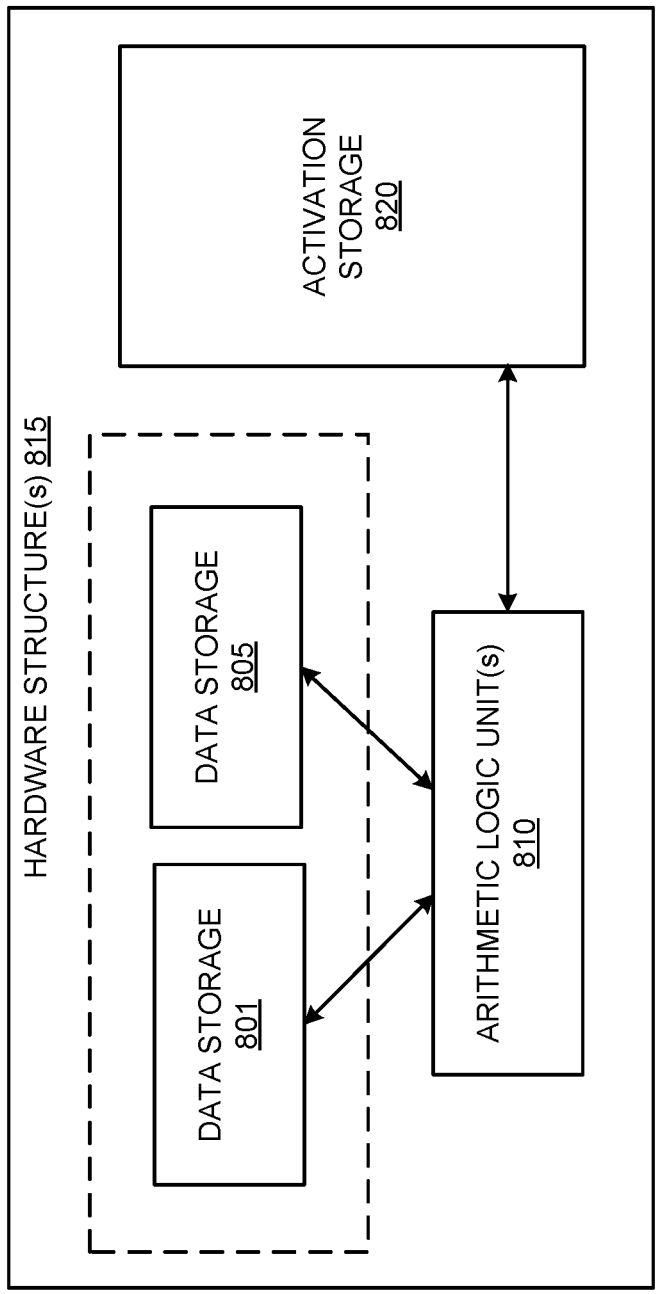
FIG. 8A illustrates inference and/or training logic, according to at least one embodiment.

FIG. 8A illustrates inference and/or training logic 815 used to perform inferencing and/or training operations associated with one or more embodiments. Details regarding inference and/or training logic 815 are provided below in conjunction with FIGS. 8A and/or 8B.

In at least one embodiment, inference and/or training logic 815 may include, without limitation, code and/or data storage 801 to store forward and/or output weight and/or input/output data, and/or other parameters to configure neurons or layers of a neural network trained and/or used for inferencing in aspects of one or more embodiments. In at least one embodiment, training logic 815 may include, or be coupled to code and/or data storage 801 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 801 may be included with other on-chip or off-chip data storage, including a processor's L1, L2, or L3 cache or system memory.

In at least one embodiment, any portion of code and/or data storage 801 may be internal or external to one or more processors or other hardware logic devices or circuits. In at least one embodiment, code and/or code and/or data storage 801 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 801 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 815 may include, without limitation, a code and/or data storage 805 to store backward and/or output weight and/or input/output data corresponding to neurons or layers of a neural network trained and/or used for inferencing in aspects of one or more embodiments. In at least one embodiment, code and/or data storage 805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 815 may include, or be coupled to code and/or data storage 805 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 805 may be included with other on-chip or off-chip data storage, including a processor's L1, L2, or L3 cache or system memory. In at least one embodiment, any portion of code and/or data storage 805 may be internal or external to on one or more processors or other hardware logic devices or circuits. In at least one embodiment, code and/or data storage 805 may be cache memory, DRAM, SRAM, non-volatile memory (e.g., Flash memory), or other storage. In at least one embodiment, choice of whether code and/or data storage 805 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 801 and code and/or data storage 805 may be separate storage structures. In at least one embodiment, code and/or data storage 801 and code and/or data storage 805 may be same storage structure. In at least one embodiment, code and/or data storage 801 and code and/or data storage 805 may be partially same storage structure and partially separate storage structures. In at least one embodiment, any portion of code and/or data storage 801 and code and/or data storage 805 may be included with other on-chip or off-chip data storage, including a processor's L1, L2, or L3 cache or system memory.

In at least one embodiment, inference and/or training logic 815 may include, without limitation, one or more arithmetic logic unit(s) ("ALU(s)") 810, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 820 that are functions of input/output and/or weight parameter data stored in code and/or data storage 801 and/or code and/or data storage 805. In at least one embodiment, activations stored in activation storage 820 are generated according to linear algebraic and or matrix-based mathematics performed by ALU(s) 810 in response to performing instructions or other code, wherein weight values stored in code and/or data storage 805 and/or code and/or data storage 801 are used as operands along with other values, such as bias values, gradient information, momentum values, or other parameters or hyperparameters, any or all of which may be stored in code and/or data storage 805 or code and/or data storage 801 or another storage on or off-chip.

In at least one embodiment, ALU(s) 810 are included within one or more processors or other hardware logic devices or circuits, whereas in another embodiment, ALU(s) 810 may be external to a processor or other hardware logic device or circuit that uses them (e.g., a co-processor). In at least one embodiment, ALUs 810 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 801, code and/or data storage 805, and activation storage 820 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 820 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 820 may be cache memory, DRAM, SRAM, non-volatile memory (e.g., Flash memory), or other storage. In at least one embodiment, activation storage 820 may be completely or partially within or external to one or more processors or other logical circuits. In at least one embodiment, choice of whether activation storage 820 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 815 illustrated in FIG. 8a may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8a may be used in conjunction with central processing unit ("CPU") hardware, graphics processing unit ("GPU") hardware or other hardware, such as field programmable gate arrays ("FPGAs").

Figure 8B:
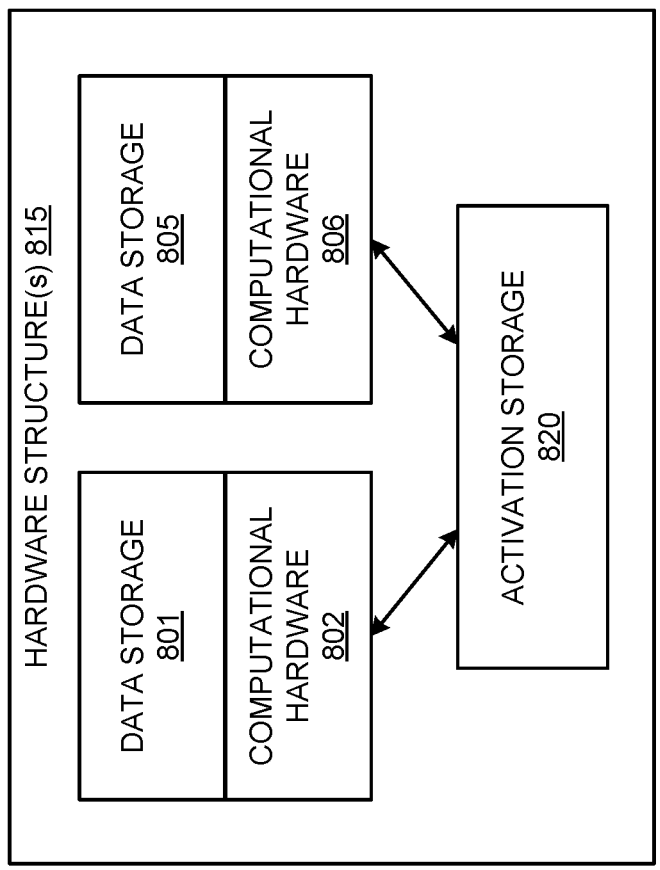
FIG. 8B illustrates inference and/or training logic, according to at least one embodiment.

FIG. 8b illustrates inference and/or training logic 815, according to at least one or more embodiments. In at least one embodiment, inference and/or training logic 815 may include, without limitation, hardware logic in which computational resources are dedicated or otherwise exclusively used in conjunction with weight values or other information corresponding to one or more layers of neurons within a neural network. In at least one embodiment, inference and/or training logic 815 illustrated in FIG. 8b may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8b may be used in conjunction with central processing unit (CPU) hardware, graphics processing unit (GPU) hardware or other hardware, such as field programmable gate arrays (FPGAs). In at least one embodiment, inference and/or training logic 815 includes, without limitation, code and/or data storage 801 and code and/or data storage 805, which may be used to store code (e.g., graph code), weight values and/or other information, including bias values, gradient information, momentum values, and/or other parameter or hyperparameter information. In at least one embodiment illustrated in FIG. 8b, each of code and/or data storage 801 and code and/or data storage 805 is associated with a dedicated computational resource, such as computational hardware 802 and computational hardware 806, respectively. In at least one embodiment, each of computational hardware 802 and computational hardware 806 comprises one or more ALUs that perform mathematical functions, such as linear algebraic functions, only on information stored in code and/or data storage 801 and code and/or data storage 805, respectively, result of which is stored in activation storage 820.

In at least one embodiment, each of code and/or data storage 801 and 805 and corresponding computational hardware 802 and 806, respectively, correspond to different layers of a neural network, such that resulting activation from one "storage/computational pair 801/802" of code and/or data storage 801 and computational hardware 802 is provided as an input to "storage/computational pair 805/806" of code and/or data storage 805 and computational hardware 806, in order to mirror conceptual organization of a neural network. In at least one embodiment, each of storage/computational pairs 801/802 and 805/806 may correspond to more than one neural network layer. In at least one embodiment, additional storage/computation pairs (not shown) subsequent to or in parallel with storage computation pairs 801/802 and 805/806 may be included in inference and/or training logic 815.

Data Center

Figure 9:
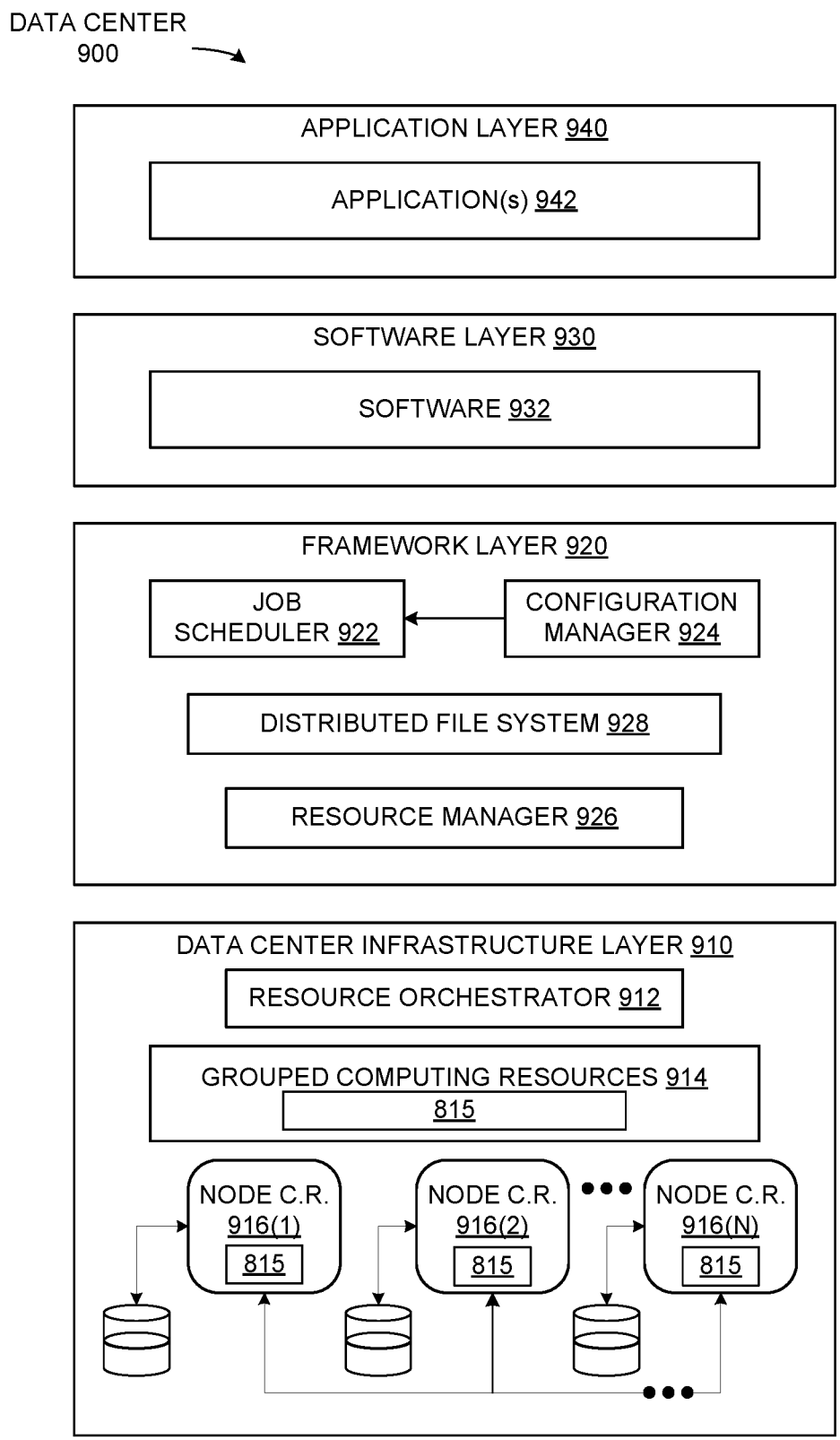
FIG. 9 illustrates an example data center system, according to at least one embodiment.

FIG. 9 illustrates an example data center 900, in which at least one embodiment may be used. In at least one embodiment, data center 900 includes a data center infrastructure layer 910, a framework layer 920, a software layer 930, and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 912 may configure or otherwise control one or more node C.R.s 916(1)-916(N) and/or grouped computing resources 914. In at least one embodiment, resource orchestrator 912 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 922, a configuration manager 924, a resource manager 926 and a distributed file system 928. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may use distributed file system 928 for large-scale data processing (e.g., "big data"). In at least one embodiment, job scheduler 922 may include a Spark driver to facilitate scheduling of workloads supported by various layers of data center 900. In at least one embodiment, configuration manager 924 may be capable of configuring different layers such as software layer 930 and framework layer 920 including Spark and distributed file system 928 for supporting large-scale data processing. In at least one embodiment, resource manager 926 may be capable of managing clustered or grouped computing resources mapped to or allocated for support of distributed file system 928 and job scheduler 922. In at least one embodiment, clustered or grouped computing resources may include grouped computing resource 914 at data center infrastructure layer 910. In at least one embodiment, resource manager 926 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 928 of framework layer 920. The one or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 928 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 924, resource manager 926, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underused and/or poor performing portions of a data center.

In at least one embodiment, data center 900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 815 are used to perform inferencing and/or training operations associated with one or more embodiments. Details regarding inference and/or training logic 815 are provided below in conjunction with FIGS. 8a and/or 8b. In at least one embodiment, inference and/or training logic 815 may be used in system FIG. 9 for inferencing or predicting operations based, at least in part, on weight parameters calculated using neural network training operations, neural network functions and/or architectures, or neural network use cases described herein.

Figure 10:
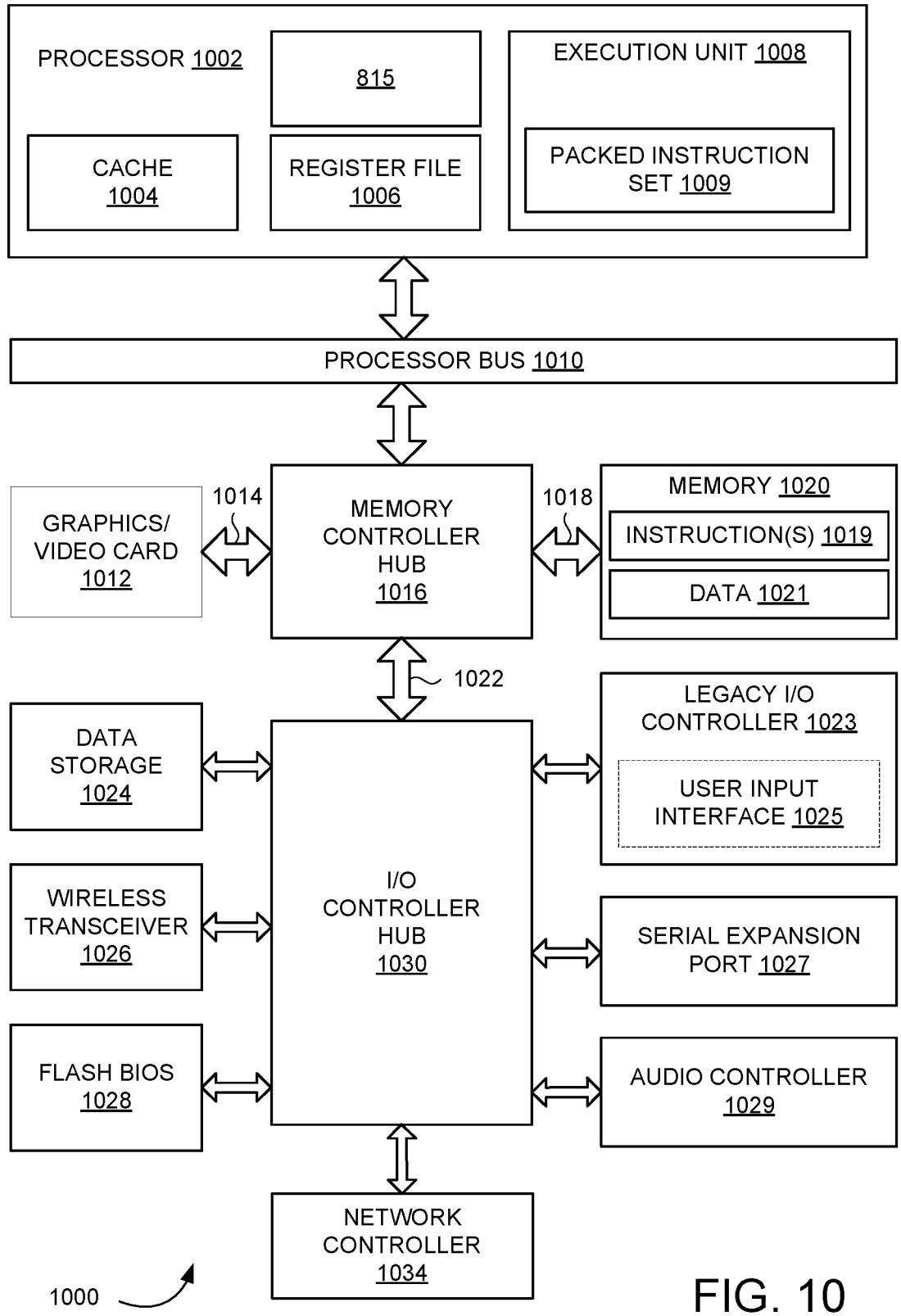
FIG. 10 illustrates a computer system, according to at least one embodiment.

Such components can be used to enable custom tasks to be performed using the same model, such as a large language model, without a need to retrain the model Computer Systems FIG. 10 is a block diagram illustrating an exemplary computer system, which may be a system with interconnected devices and components, a system-on-a-chip (SOC) or some combination thereof 1000 formed with a processor that may include execution units to execute an instruction, according to at least one embodiment. In at least one embodiment, computer system 1000 may include, without limitation, a component, such as a processor 1002 to employ execution units including logic to perform algorithms for process data, in accordance with present disclosure, such as in embodiment described herein. In at least one embodiment, computer system 1000 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1000 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1000 may include, without limitation, processor 1002 that may include, without limitation, one or more execution units 1008 to perform machine learning model training and/or inferencing according to techniques described herein. In at least one embodiment, computer system 1000 is a single processor desktop or server system, but in another embodiment computer system 1000 may be a multiprocessor system. In at least one embodiment, processor 1002 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1002 may be coupled to a processor bus 1010 that may transmit data signals between processor 1002 and other components in computer system 1000.

In at least one embodiment, processor 1002 may include, without limitation, a Level 1 ("L1") internal cache memory ("cache") 1004. In at least one embodiment, processor 1002 may have a single internal cache or multiple levels of internal cache. In at least one embodiment, cache memory may reside external to processor 1002. Other embodiments may also include a combination of both internal and external caches depending on particular implementation and needs. In at least one embodiment, register file 1006 may store different types of data in various registers including, without limitation, integer registers, floating point registers, status registers, and instruction pointer register.

In at least one embodiment, execution unit 1008, including, without limitation, logic to perform integer and floating point operations, also resides in processor 1002. In at least one embodiment, processor 1002 may also include a microcode ("ucode") read only memory ("ROM") that stores microcode for certain macro instructions. In at least one embodiment, execution unit 1008 may include logic to handle a packed instruction set 1009. In at least one embodiment, by including packed instruction set 1009 in an instruction set of a general-purpose processor 1002, along with associated circuitry to execute instructions, operations used by many multimedia applications may be performed using packed data in a general-purpose processor 1002. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1008 may also be used in microcontrollers, embedded processors, graphics devices, DSPs, and other types of logic circuits. In at least one embodiment, computer system 1000 may include, without limitation, a memory 1020. In at least one embodiment, memory 1020 may be implemented as a Dynamic Random Access Memory ("DRAM") device, a Static Random Access Memory ("SRAM") device, flash memory device, or other memory device. In at least one embodiment, memory 1020 may store instruction(s) 1019 and/or data 1021 represented by data signals that may be executed by processor 1002.

In at least one embodiment, system logic chip may be coupled to processor bus 1010 and memory 1020. In at least one embodiment, system logic chip may include, without limitation, a memory controller hub ("MCH") 1016, and processor 1002 may communicate with MCH 1016 via processor bus 1010. In at least one embodiment, MCH 1016 may provide a high bandwidth memory path 1018 to memory 1020 for instruction and data storage and for storage of graphics commands, data and textures. In at least one embodiment, MCH 1016 may direct data signals between processor 1002, memory 1020, and other components in computer system 1000 and to bridge data signals between processor bus 1010, memory 1020, and a system I/O 1022. In at least one embodiment, system logic chip may provide a graphics port for coupling to a graphics controller. In at least one embodiment, MCH 1016 may be coupled to memory 1020 through a high bandwidth memory path 1018 and graphics/video card 1012 may be coupled to MCH 1016 through an Accelerated Graphics Port ("AGP") interconnect 1014.

In at least one embodiment, computer system 1000 may use system I/O 1022 that is a proprietary hub interface bus to couple MCH 1016 to I/O controller hub ("ICH") 1030. In at least one embodiment, ICH 1030 may provide direct connections to some I/O devices via a local I/O bus. In at least one embodiment, local I/O bus may include, without limitation, a high-speed I/O bus for connecting peripherals to memory 1020, chipset, and processor 1002. Examples may include, without limitation, an audio controller 1029, a firmware hub ("flash BIOS") 1028, a wireless transceiver 1026, a data storage 1024, a legacy I/O controller 1023 containing user input and keyboard interfaces 1025, a serial expansion port 1027, such as Universal Serial Bus ("USB"), and a network controller 1034. Data storage 1024 may comprise a hard disk drive, a floppy disk drive, a CD-ROM device, a flash memory device, or other mass storage device.

In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1000 are interconnected using compute express link (CXL) interconnects.

Inference and/or training logic 815 are used to perform inferencing and/or training operations associated with one or more embodiments. Details regarding inference and/or training logic 815 are provided below in conjunction with FIGS. 8a and/or 8b. In at least one embodiment, inference and/or training logic 815 may be used in system FIG. 10 for inferencing or predicting operations based, at least in part, on weight parameters calculated using neural network training operations, neural network functions and/or architectures, or neural network use cases described herein.

Such components can be used to enable custom tasks to be performed using the same model, such as a large language model, without a need to retrain the model.

Figure 11:
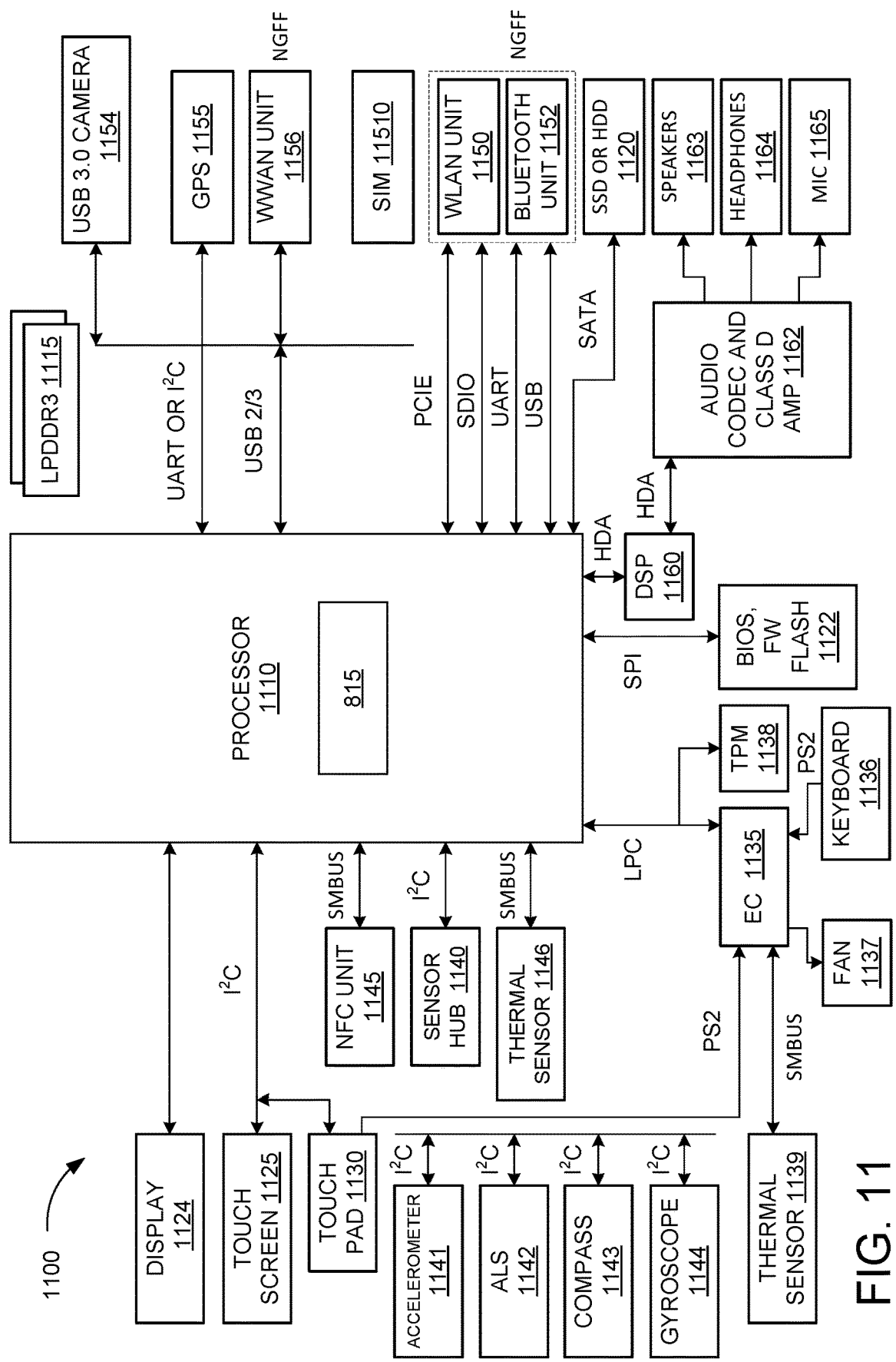
FIG. 11 illustrates a computer system, according to at least one embodiment.

FIG. 11 is a block diagram illustrating an electronic device 1100 for utilizing a processor 1110, according to at least one embodiment. In at least one embodiment, electronic device 1100 may be, for example and without limitation, a notebook, a tower server, a rack server, a blade server, a laptop, a desktop, a tablet, a mobile device, a phone, an embedded computer, or any other suitable electronic device.

In at least one embodiment, system 1100 may include, without limitation, processor 1110 communicatively coupled to any suitable number or kind of components, peripherals, modules, or devices. In at least one embodiment, processor 1110 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 11 illustrates a system, which includes interconnected hardware devices or "chips", whereas in other embodiments, FIG. 11 may illustrate an exemplary System on a Chip ("SoC"). In at least one embodiment, devices illustrated in FIG. 11 may be interconnected with proprietary interconnects, standardized interconnects (e.g., PCIe) or some combination thereof. In at least one embodiment, one or more components of FIG. 11 are interconnected using compute express link (CXL) interconnects.

In at least one embodiment, FIG. 11 may include a display 1124, a touch screen 1125, a touch pad 1130, a Near Field Communications unit ("NFC") 1145, a sensor hub 1140, a thermal sensor 1146, an Express Chipset ("EC") 1135, a Trusted Platform Module ("TPM") 1138, BIOS/firmware/flash memory ("BIOS, FW Flash") 1122, a DSP 1160, a drive 1120 such as a Solid State Disk ("SSD") or a Hard Disk Drive ("HDD"), a wireless local area network unit ("WLAN") 1150, a Bluetooth unit 1152, a Wireless Wide Area Network unit ("WWAN") 1156, a Global Positioning System (GPS) 1155, a camera ("USB 3.0 camera") 1154 such as a USB 3.0 camera, and/or a Low Power Double Data Rate ("LPDDR") memory unit ("LPDDR3") 1115 implemented in, for example, LPDDR3 standard. These components may each be implemented in any suitable manner.

In at least one embodiment, other components may be communicatively coupled to processor 1110 through components discussed above. In at least one embodiment, an accelerometer 1141, Ambient Light Sensor ("ALS") 1142, compass 1143, and a gyroscope 1144 may be communicatively coupled to sensor hub 1140. In at least one embodiment, thermal sensor 1139, a fan 1137, a keyboard 1146, and a touch pad 1130 may be communicatively coupled to EC 1135. In at least one embodiment, speaker 1163, headphones 1164, and microphone ("mic") 1165 may be communicatively coupled to an audio unit ("audio codec and class d amp") 1162, which may in turn be communicatively coupled to DSP 1160. In at least one embodiment, audio unit 1164 may include, for example and without limitation, an audio coder/decoder ("codec") and a class D amplifier. In at least one embodiment, SIM card ("SIM") 1157 may be communicatively coupled to WWAN unit 1156. In at least one embodiment, components such as WLAN unit 1150 and Bluetooth unit 1152, as well as WWAN unit 1156 may be implemented in a Next Generation Form Factor ("NGFF").

Inference and/or training logic 815 are used to perform inferencing and/or training operations associated with one or more embodiments. Details regarding inference and/or training logic 815 are provided below in conjunction with FIGS. 8a and/or 8b. In at least one embodiment, inference and/or training logic 815 may be used in system FIG. 10 for inferencing or predicting operations based, at least in part, on weight parameters calculated using neural network training operations, neural network functions and/or architectures, or neural network use cases described herein.

Such components can be used to enable custom tasks to be performed using the same model, such as a large language model, without a need to retrain the model.

Figure 12:
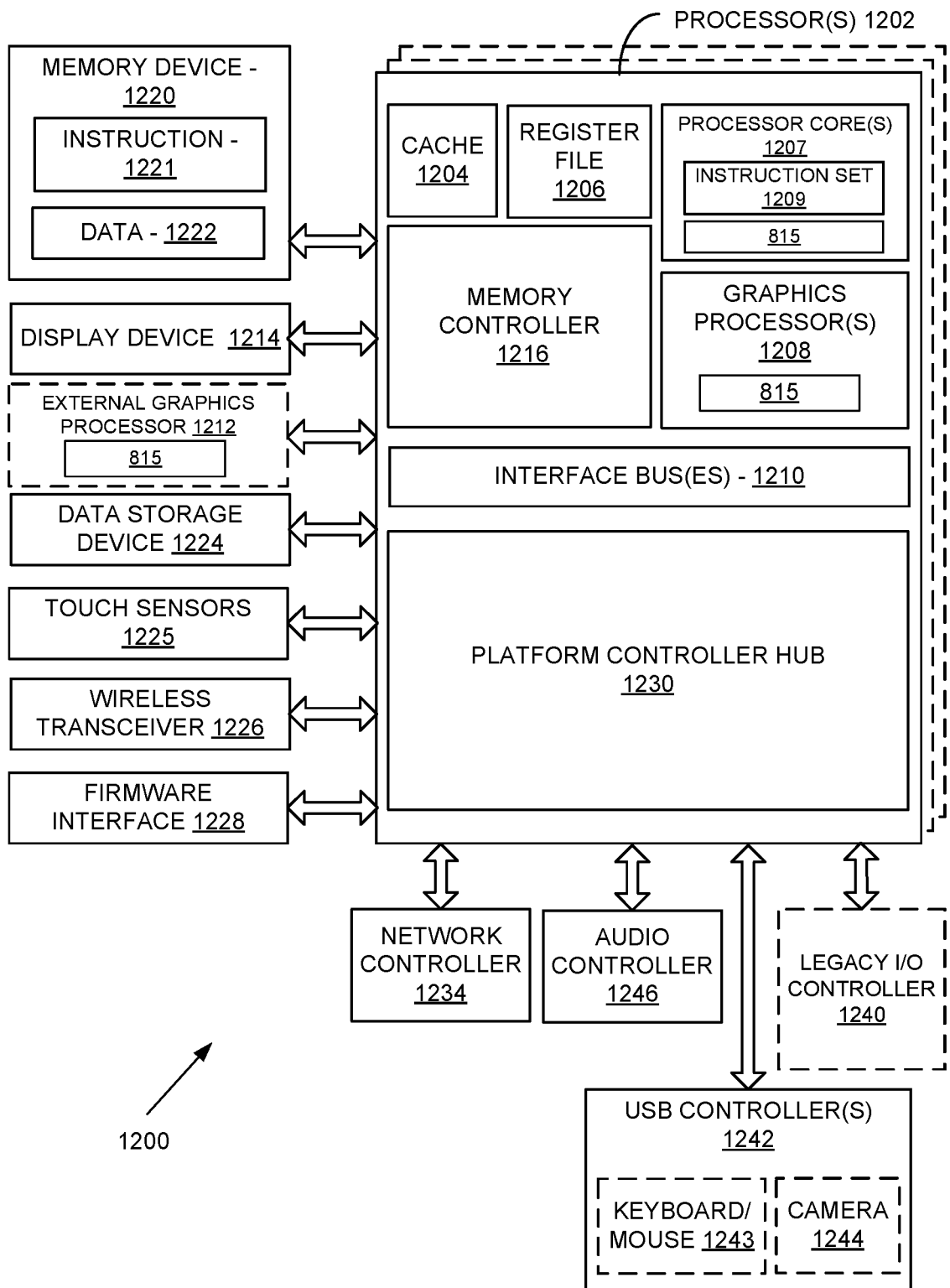
FIG. 12 illustrates at least portions of a graphics processor, according to one or more embodiments.

FIG. 12 is a block diagram of a processing system, according to at least one embodiment. In at least one embodiment, system 1200 includes one or more processors 1202 and one or more graphics processors 1208, and may be a single processor desktop system, a multiprocessor workstation system, or a server system having a large number of processors 1202 or processor cores 1207. In at least one embodiment, system 1200 is a processing platform incorporated within a system-on-a-chip (SoC) integrated circuit for use in mobile, handheld, or embedded devices.

In at least one embodiment, system 1200 can include, or be incorporated within a server-based gaming platform, a game console, including a game and media console, a mobile gaming console, a handheld game console, or an online game console. In at least one embodiment, system 1200 is a mobile phone, smart phone, tablet computing device or mobile Internet device. In at least one embodiment, processing system 1200 can also include, couple with, or be integrated within a wearable device, such as a smart watch wearable device, smart eyewear device, augmented reality device, or virtual reality device. In at least one embodiment, processing system 1200 is a television or set top box device having one or more processors 1202 and a graphical interface generated by one or more graphics processors 1208.

In at least one embodiment, one or more processors 1202 each include one or more processor cores 1207 to process instructions which, when executed, perform operations for system and user software. In at least one embodiment, each of one or more processor cores 1207 is configured to process a specific instruction set 1209. In at least one embodiment, instruction set 1209 may facilitate Complex Instruction Set Computing (CISC), Reduced Instruction Set Computing (RISC), or computing via a Very Long Instruction Word (VLIW). In at least one embodiment, processor cores 1207 may each process a different instruction set 1209, which may include instructions to facilitate emulation of other instruction sets. In at least one embodiment, processor core 1207 may also include other processing devices, such a Digital Signal Processor (DSP).

In at least one embodiment, processor 1202 includes cache memory 1204. In at least one embodiment, processor 1202 can have a single internal cache or multiple levels of internal cache. In at least one embodiment, cache memory is shared among various components of processor 1202. In at least one embodiment, processor 1202 also uses an external cache (e.g., a Level-3 (L3) cache or Last Level Cache (LLC)) (not shown), which may be shared among processor cores 1207 using known cache coherency techniques. In at least one embodiment, register file 1206 is additionally included in processor 1202 which may include different types of registers for storing different types of data (e.g., integer registers, floating point registers, status registers, and an instruction pointer register). In at least one embodiment, register file 1206 may include general-purpose registers or other registers.

In at least one embodiment, one or more processor(s) 1202 are coupled with one or more interface bus(es) 1210 to transmit communication signals such as address, data, or control signals between processor 1202 and other components in system 1200. In at least one embodiment, interface bus 1210, in one embodiment, can be a processor bus, such as a version of a Direct Media Interface (DMI) bus. In at least one embodiment, interface 1210 is not limited to a DMI bus, and may include one or more Peripheral Component Interconnect buses (e.g., PCI, PCI Express), memory busses, or other types of interface busses. In at least one embodiment processor(s) 1202 include an integrated memory controller 1216 and a platform controller hub 1230. In at least one embodiment, memory controller 1216 facilitates communication between a memory device and other components of system 1200, while platform controller hub (PCH) 1230 provides connections to I/O devices via a local I/O bus.

In at least one embodiment, memory device 1220 can be a dynamic random access memory (DRAM) device, a static random access memory (SRAM) device, flash memory device, phase-change memory device, or some other memory device having suitable performance to serve as process memory. In at least one embodiment memory device 1220 can operate as system memory for system 1200, to store data 1222 and instructions 1221 for use when one or more processors 1202 executes an application or process. In at least one embodiment, memory controller 1216 also couples with an optional external graphics processor 1212, which may communicate with one or more graphics processors 1208 in processors 1202 to perform graphics and media operations. In at least one embodiment, a display device 1211 can connect to processor(s) 1202. In at least one embodiment display device 1211 can include one or more of an internal display device, as in a mobile electronic device or a laptop device or an external display device attached via a display interface (e.g., DisplayPort, etc.). In at least one embodiment, display device 1211 can include a head mounted display (HMD) such as a stereoscopic display device for use in virtual reality (VR) applications or augmented reality (AR) applications.

In at least one embodiment, platform controller hub 1230 enables peripherals to connect to memory device 1220 and processor 1202 via a high-speed I/O bus. In at least one embodiment, I/O peripherals include, but are not limited to, an audio controller 1246, a network controller 1234, a firmware interface 1228, a wireless transceiver 1226, touch sensors 1225, a data storage device 1224 (e.g., hard disk drive, flash memory, etc.). In at least one embodiment, data storage device 1224 can connect via a storage interface (e.g., SATA) or via a peripheral bus, such as a Peripheral Component Interconnect bus (e.g., PCI, PCI Express). In at least one embodiment, touch sensors 1225 can include touch screen sensors, pressure sensors, or fingerprint sensors. In at least one embodiment, wireless transceiver 1226 can be a Wi-Fi transceiver, a Bluetooth transceiver, or a mobile network transceiver such as a 3G, 4G, or Long Term Evolution (LTE) transceiver. In at least one embodiment, firmware interface 1228 enables communication with system firmware, and can be, for example, a unified extensible firmware interface (UEFI). In at least one embodiment, network controller 1234 can enable a network connection to a wired network. In at least one embodiment, a high-performance network controller (not shown) couples with interface bus 1210. In at least one embodiment, audio controller 1246 is a multi-channel high definition audio controller. In at least one embodiment, system 1200 includes an optional legacy I/O controller 1240 for coupling legacy (e.g., Personal System 2 (PS/2)) devices to system. In at least one embodiment, platform controller hub 1230 can also connect to one or more Universal Serial Bus (USB) controllers 1242 connect input devices, such as keyboard and mouse 1243 combinations, a camera 1244, or other USB input devices.

In at least one embodiment, an instance of memory controller 1216 and platform controller hub 1230 may be integrated into a discreet external graphics processor, such as external graphics processor 1212. In at least one embodiment, platform controller hub 1230 and/or memory controller 1216 may be external to one or more processor(s) 1202. For example, in at least one embodiment, system 1200 can include an external memory controller 1216 and platform controller hub 1230, which may be configured as a memory controller hub and peripheral controller hub within a system chipset that is in communication with processor(s) 1202.

Inference and/or training logic 815 are used to perform inferencing and/or training operations associated with one or more embodiments. Details regarding inference and/or training logic 815 are provided below in conjunction with FIGS. 8a and/or 8b. In at least one embodiment portions or all of inference and/or training logic 815 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 8A or 8B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to enable custom tasks to be performed using the same model, such as a large language model, without a need to retrain the model.

Figure 13:
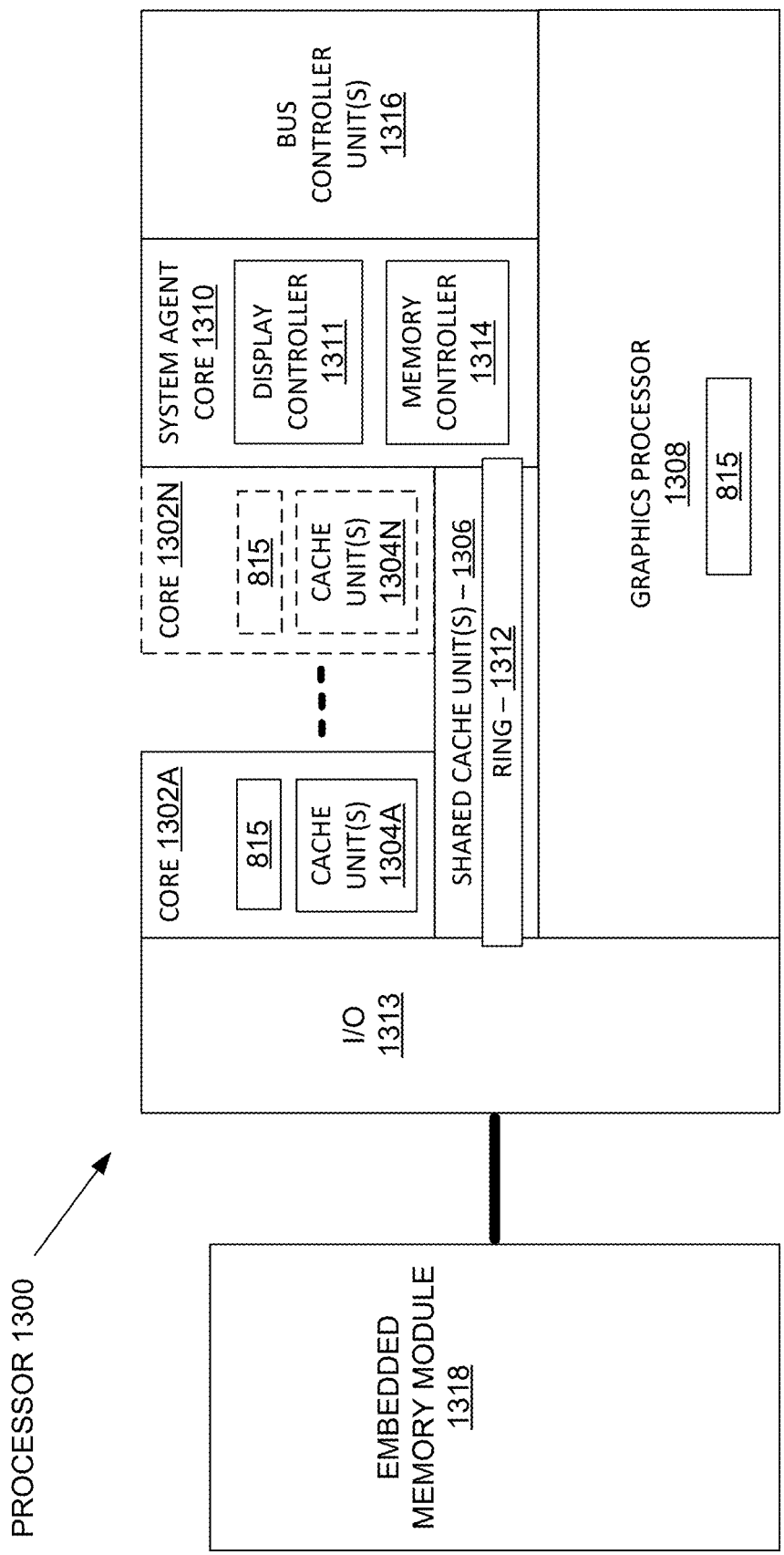
FIG. 13 illustrates at least portions of a graphics processor, according to one or more embodiments.

FIG. 13 is a block diagram of a processor 1300 having one or more processor cores 1302A-1302N, an integrated memory controller 1314, and an integrated graphics processor 1308, according to at least one embodiment. In at least one embodiment, processor 1300 can include additional cores up to and including additional core 1302N represented by dashed lined boxes. In at least one embodiment, each of processor cores 1302A-1302N includes one or more internal cache units 1304A-1304N. In at least one embodiment, each processor core also has access to one or more shared cached units 1306.

In at least one embodiment, internal cache units 1304A-1304N and shared cache units 1306 represent a cache memory hierarchy within processor 1300. In at least one embodiment, cache memory units 1304A-1304N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1306 and 1304A-1304N.

In at least one embodiment, processor 1300 may also include a set of one or more bus controller units 1316 and a system agent core 1310. In at least one embodiment, one or more bus controller units 1316 manage a set of peripheral buses, such as one or more PCI or PCI express busses. In at least one embodiment, system agent core 1310 provides management functionality for various processor components. In at least one embodiment, system agent core 1310 includes one or more integrated memory controllers 1314 to manage access to various external memory devices (not shown).

In at least one embodiment, one or more of processor cores 1302A-1302N include support for simultaneous multi-threading. In at least one embodiment, system agent core 1310 includes components for coordinating and operating cores 1302A-1302N during multi-threaded processing. In at least one embodiment, system agent core 1310 may additionally include a power control unit (PCU), which includes logic and components to regulate one or more power states of processor cores 1302A-1302N and graphics processor 1308.

In at least one embodiment, processor 1300 additionally includes graphics processor 1308 to execute graphics processing operations. In at least one embodiment, graphics processor 1308 couples with shared cache units 1306, and system agent core 1310, including one or more integrated memory controllers 1314. In at least one embodiment, system agent core 1310 also includes a display controller 1311 to drive graphics processor output to one or more coupled displays. In at least one embodiment, display controller 1311 may also be a separate module coupled with graphics processor 1308 via at least one interconnect, or may be integrated within graphics processor 1308.

In at least one embodiment, a ring based interconnect unit 1312 is used to couple internal components of processor 1300. In at least one embodiment, an alternative interconnect unit may be used, such as a point-to-point interconnect, a switched interconnect, or other techniques. In at least one embodiment, graphics processor 1308 couples with ring interconnect 1312 via an I/O link 1313.

In at least one embodiment, I/O link 1313 represents at least one of multiple varieties of I/O interconnects, including an on package I/O interconnect which facilitates communication between various processor components and a high-performance embedded memory module 1318, such as an eDRAM module. In at least one embodiment, each of processor cores 1302A-1302N and graphics processor 1308 use embedded memory modules 1318 as a shared Last Level Cache.

In at least one embodiment, processor cores 1302A-1302N are homogenous cores executing a common instruction set architecture. In at least one embodiment, processor cores 1302A-1302N are heterogeneous in terms of instruction set architecture (ISA), where one or more of processor cores 1302A-1302N execute a common instruction set, while one or more other cores of processor cores 1302A-1302N executes a subset of a common instruction set or a different instruction set. In at least one embodiment, processor cores 1302A-1302N are heterogeneous in terms of microarchitecture, where one or more cores having a relatively higher power consumption couple with one or more power cores having a lower power consumption. In at least one embodiment, processor 1300 can be implemented on one or more chips or as an SoC integrated circuit.

Inference and/or training logic 815 are used to perform inferencing and/or training operations associated with one or more embodiments. Details regarding inference and/or training logic 815 are provided below in conjunction with FIGS. 8a and/or 8b. In at least one embodiment portions or all of inference and/or training logic 815 may be incorporated into processor 1300. For example, in at least one embodiment, training and/or inferencing techniques described herein may use one or more of ALUs embodied in graphics processor 1312, graphics core(s) 1302A-1302N, or other components in FIG. 13. Moreover, in at least one embodiment, inferencing and/or training operations described herein may be done using logic other than logic illustrated in FIG. 8A or 8B. In at least one embodiment, weight parameters may be stored in on-chip or off-chip memory and/or registers (shown or not shown) that configure ALUs of graphics processor 1300 to perform one or more machine learning algorithms, neural network architectures, use cases, or training techniques described herein.

Such components can be used to enable custom tasks to be performed using the same model, such as a large language model, without a need to retrain the model.

Virtualized Computing Platform

Figure 14:
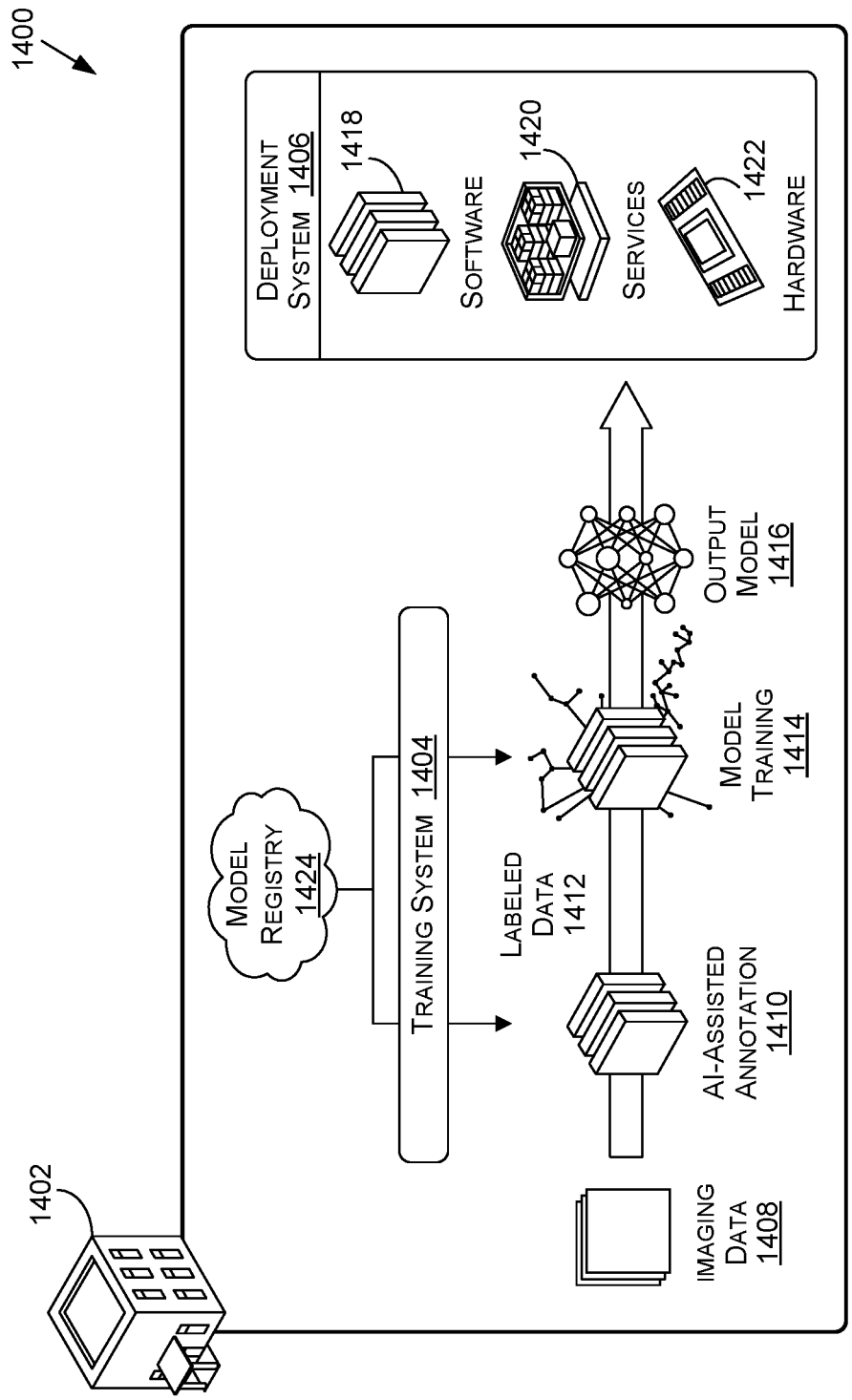
FIG. 14 is an example data flow diagram for an advanced computing pipeline, in accordance with at least one embodiment.

FIG. 14 is an example data flow diagram for a process 1400 of generating and deploying an image processing and inferencing pipeline, in accordance with at least one embodiment. In at least one embodiment, process 1400 may be deployed for use with imaging devices, processing devices, and/or other device types at one or more facilities 1402. Process 1400 may be executed within a training system 1404 and/or a deployment system 1406. In at least one embodiment, training system 1404 may be used to perform training, deployment, and implementation of machine learning models (e.g., neural networks, object detection algorithms, computer vision algorithms, etc.) for use in deployment system 1406. In at least one embodiment, deployment system 1406 may be configured to offload processing and compute resources among a distributed computing environment to reduce infrastructure requirements at facility 1402. In at least one embodiment, one or more applications in a pipeline may use or call upon services (e.g., inference, visualization, compute, AI, etc.) of deployment system 1406 during execution of applications.

In at least one embodiment, some of applications used in advanced processing and inferencing pipelines may use machine learning models or other AI to perform one or more processing steps. In at least one embodiment, machine learning models may be trained at facility 1402 using data 1408 (such as imaging data) generated at facility 1402 (and stored on one or more picture archiving and communication system (PACS) servers at facility 1402), may be trained using imaging or sequencing data 1408 from another facility (ies), or a combination thereof. In at least one embodiment, training system 1404 may be used to provide applications, services, and/or other resources for generating working, deployable machine learning models for deployment system 1406.

In at least one embodiment, model registry 1424 may be backed by object storage that may support versioning and object metadata. In at least one embodiment, object storage may be accessible through, for example, a cloud storage (e.g., cloud 1226 of FIG. 12) compatible application programming interface (API) from within a cloud platform. In at least one embodiment, machine learning models within model registry 1424 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1402 is training their own machine learning model, or has an existing machine learning model that needs to be optimized or updated. In at least one embodiment, imaging data 1408 generated by imaging device(s), sequencing devices, and/or other device types may be received. In at least one embodiment, once imaging data 1408 is received, AI-assisted annotation 1410 may be used to aid in generating annotations corresponding to imaging data 1408 to be used as ground truth data for a machine learning model. In at least one embodiment, AI-assisted annotation 1410 may include one or more machine learning models (e.g., convolutional neural networks (CNNs)) that may be trained to generate annotations corresponding to certain types of imaging data 1408 (e.g., from certain devices). In at least one embodiment, AI-assisted annotations 1410 may then be used directly, or may be adjusted or fine-tuned using an annotation tool to generate ground truth data. In at least one embodiment, AI-assisted annotations 1410, labeled clinic data 1412, or a combination thereof may be used as ground truth data for training a machine learning model. In at least one embodiment, a trained machine learning model may be referred to as output model 1416, and may be used by deployment system 1406, as described herein.

In at least one embodiment, training pipeline 1204 (FIG. 12) may include a scenario where facility 1402 needs a machine learning model for use in performing one or more processing tasks for one or more applications in deployment system 1406, but facility 1402 may not currently have such a machine learning model (or may not have a model that is optimized, efficient, or effective for such purposes). In at least one embodiment, an existing machine learning model may be selected from a model registry 1424. In at least one embodiment, model registry 1424 may include machine learning models trained to perform a variety of different inference tasks on imaging data. In at least one embodiment, machine learning models in model registry 1424 may have been trained on imaging data from different facilities than facility 1402 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1424. In at least one embodiment, a machine learning model may then be retrained, or updated, at any number of other facilities, and a retrained or updated model may be made available in model registry 1424. In at least one embodiment, a machine learning model may then be selected from model registry 1424—and referred to as output model 1416—and may be used in deployment system 1406 to perform one or more processing tasks for one or more applications of a deployment system.

In at least one embodiment, training pipeline 1204 (FIG. 12), a scenario may include facility 1402 requiring a machine learning model for use in performing one or more processing tasks for one or more applications in deployment system 1406, but facility 1402 may not currently have such a machine learning model (or may not have a model that is optimized, efficient, or effective for such purposes). In at least one embodiment, a machine learning model selected from model registry 1424 may not be fine-tuned or optimized for imaging data 1408 generated at facility 1402 because of differences in populations, robustness of training data used to train a machine learning model, diversity in anomalies of training data, and/or other issues with training data. In at least one embodiment, AI-assisted annotation 1410 may be used to aid in generating annotations corresponding to imaging data 1408 to be used as ground truth data for retraining or updating a machine learning model. In at least one embodiment, labeled data 1412 may be used as ground truth data for training a machine learning model. In at least one embodiment, retraining or updating a machine learning model may be referred to as model training 1414.

In at least one embodiment, model training 1414—e.g., AI-assisted annotations 1410, labeled clinic data 1412, or a combination thereof—may be used as ground truth data for retraining or updating a machine learning model. In at least one embodiment, a trained machine learning model may be referred to as output model 1416, and may be used by deployment system 1406, as described herein.

In at least one embodiment, deployment system 1406 may include software 1418, services 1420, hardware 1422, and/or other components, features, and functionality. In at least one embodiment, deployment system 1406 may include a software "stack," such that software 1418 may be built on top of services 1420 and may use services 1420 to perform some or all of processing tasks, and services 1420 and software 1418 may be built on top of hardware 1422 and use hardware 1422 to execute processing, storage, and/or other compute tasks of deployment system 1406. In at least one embodiment, software 1418 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1408, in addition to containers that receive and configure imaging data for use by each container and/or for use by facility 1402 after processing through a pipeline (e.g., to convert outputs back to a usable data type). In at least one embodiment, a combination of containers within software 1418 (e.g., that make up a pipeline) may be referred to as a virtual instrument (as described in more detail herein), and a virtual instrument may leverage services 1420 and hardware 1422 to execute some or all processing tasks of applications instantiated in containers.

In at least one embodiment, a data processing pipeline may receive input data (e.g., imaging data 1408) in a specific format in response to an inference request (e.g., a request from a user of deployment system 1406). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1416 of training system 1404.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1424 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1420 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1424. In at least one embodiment, a requesting entity—who provides an inference or image processing request—may browse a container registry and/or model registry 1424 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1406 (e.g., a cloud) to perform processing of data processing pipeline. In at least one embodiment, processing by deployment system 1406 may include referencing selected elements (e.g., applications, containers, models, etc.) from a container registry and/or model registry 1424. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1420 may be leveraged. In at least one embodiment, services 1420 may include compute services, artificial intelligence (AI) services, visualization services, and/or other service types. In at least one embodiment, services 1420 may provide functionality that is common to one or more applications in software 1418, so functionality may be abstracted to a service that may be called upon or leveraged by applications. In at least one embodiment, functionality provided by services 1420 may run dynamically and more efficiently, while also scaling well by allowing applications to process data in parallel (e.g., using a parallel computing platform 1230 (FIG. 12)). In at least one embodiment, rather than each application that shares a same functionality offered by a service 1420 being required to have a respective instance of service 1420, service 1420 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1420 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1418 implementing advanced processing and inferencing pipeline that includes segmentation application and anomaly detection application may be streamlined because each application may call upon a same inference service to perform one or more inferencing tasks.

In at least one embodiment, hardware 1422 may include GPUs, CPUs, graphics cards, an AI/deep learning system (e.g., an AI supercomputer, such as NVIDIA's DGX), a cloud platform, or a combination thereof. In at least one embodiment, different types of hardware 1422 may be used to provide efficient, purpose-built support for software 1418 and services 1420 in deployment system 1406. In at least one embodiment, use of GPU processing may be implemented for processing locally (e.g., at facility 1402), within an AI/deep learning system, in a cloud system, and/or in other processing components of deployment system 1406 to improve efficiency, accuracy, and efficacy of image processing and generation. In at least one embodiment, software 1418 and/or services 1420 may be optimized for GPU processing with respect to deep learning, machine learning, and/or high-performance computing, as non-limiting examples. In at least one embodiment, at least some of computing environment of deployment system 1406 and/or training system 1404 may be executed in a datacenter one or more supercomputers or high performance computing systems, with GPU optimized software (e.g., hardware and software combination of NVIDIA's DGX System). In at least one embodiment, hardware 1422 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 15:
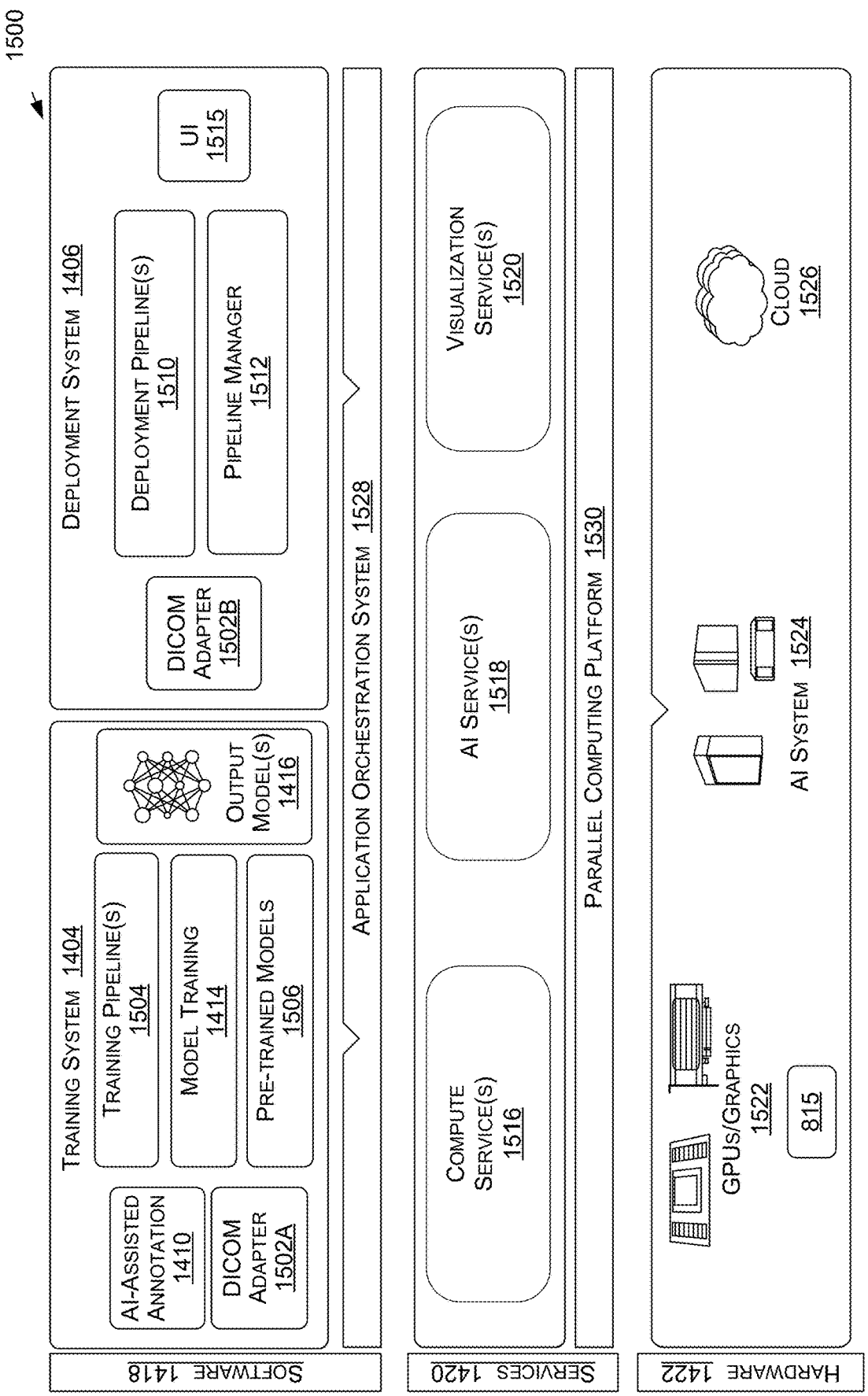
FIG. 15 is a system diagram for an example system for training, adapting, instantiating and deploying machine learning models in an advanced computing pipeline, in accordance with at least one embodiment.

FIG. 15 is a system diagram for an example system 1500 for generating and deploying an imaging deployment pipeline, in accordance with at least one embodiment. In at least one embodiment, system 1500 may be used to implement process 1400 of FIG. 14 and/or other processes including advanced processing and inferencing pipelines. In at least one embodiment, system 1500 may include training system 1404 and deployment system 1406. In at least one embodiment, training system 1404 and deployment system 1406 may be implemented using software 1418, services 1420, and/or hardware 1422, as described herein.

In at least one embodiment, system 1500 (e.g., training system 1404 and/or deployment system 1406) may implemented in a cloud computing environment (e.g., using cloud 1526). In at least one embodiment, system 1500 may be implemented locally with respect to a healthcare services facility, or as a combination of both cloud and local computing resources. In at least one embodiment, access to APIs in cloud 1526 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1500, may be restricted to a set of public IPs that have been vetted or authorized for interaction.

In at least one embodiment, various components of system 1500 may communicate between and among one another using any of a variety of different network types, including but not limited to local area networks (LANs) and/or wide area networks (WANs) via wired and/or wireless communication protocols. In at least one embodiment, communication between facilities and components of system 1500 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1404 may execute training pipelines 1504, similar to those described herein with respect to FIG. 14. In at least one embodiment, where one or more machine learning models are to be used in deployment pipelines 1510 by deployment system 1406, training pipelines 1504 may be used to train or retrain one or more (e.g. pre-trained) models, and/or implement one or more of pre-trained models 1506 (e.g., without a need for retraining or updating). In at least one embodiment, as a result of training pipelines 1504, output model(s) 1416 may be generated. In at least one embodiment, training pipelines 1504 may include any number of processing steps, such as but not limited to imaging data (or other input data) conversion or adaption In at least one embodiment, for different machine learning models used by deployment system 1406, different training pipelines 1504 may be used. In at least one embodiment, training pipeline 1504 similar to a first example described with respect to FIG. 14 may be used for a first machine learning model, training pipeline 1504 similar to a second example described with respect to FIG. 14 may be used for a second machine learning model, and training pipeline 1504 similar to a third example described with respect to FIG. 14 may be used for a third machine learning model. In at least one embodiment, any combination of tasks within training system 1404 may be used depending on what is required for each respective machine learning model. In at least one embodiment, one or more of machine learning models may already be trained and ready for deployment so machine learning models may not undergo any processing by training system 1404, and may be implemented by deployment system 1406.

In at least one embodiment, output model(s) 1416 and/or pre-trained model(s) 1506 may include any types of machine learning models depending on implementation or embodiment. In at least one embodiment, and without limitation, machine learning models used by system 1500 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1504 may include AI-assisted annotation, as described in more detail herein with respect to at least FIG. 15B. In at least one embodiment, labeled data 1412 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1408 (or other data type used by machine learning models), there may be corresponding ground truth data generated by training system 1404. In at least one embodiment, AI-assisted annotation may be performed as part of deployment pipelines 1510; either in addition to, or in lieu of AI-assisted annotation included in training pipelines 1504. In at least one embodiment, system 1500 may include a multi-layer platform that may include a software layer (e.g., software 1418) of diagnostic applications (or other application types) that may perform one or more medical imaging and diagnostic functions. In at least one embodiment, system 1500 may be communicatively coupled to (e.g., via encrypted links) PACS server networks of one or more facilities. In at least one embodiment, system 1500 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1402). In at least one embodiment, applications may then call or execute one or more services 1420 for performing compute, AI, or visualization tasks associated with respective applications, and software 1418 and/or services 1420 may leverage hardware 1422 to perform processing tasks in an effective and efficient manner.

In at least one embodiment, deployment system 1406 may execute deployment pipelines 1510. In at least one embodiment, deployment pipelines 1510 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1510 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1510 depending on information desired from data generated by a device. In at least one embodiment, where detections of anomalies are desired from an MII machine, there may be a first deployment pipeline 1510, and where image enhancement is desired from output of an MII machine, there may be a second deployment pipeline 1510.

In at least one embodiment, an image generation application may include a processing task that includes use of a machine learning model. In at least one embodiment, a user may desire to use their own machine learning model, or to select a machine learning model from model registry 1424. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1500—such as services 1420 and hardware 1422—deployment pipelines 1510 may be even more user friendly, provide for easier integration, and produce more accurate, efficient, and timely results.

In at least one embodiment, deployment system 1406 may include a user interface 1514 (e.g., a graphical user interface, a web interface, etc.) that may be used to select applications for inclusion in deployment pipeline(s) 1510, arrange applications, modify or change applications or parameters or constructs thereof, use and interact with deployment pipeline(s) 1510 during set-up and/or deployment, and/or to otherwise interact with deployment system 1406. In at least one embodiment, although not illustrated with respect to training system 1404, user interface 1514 (or a different user interface) may be used for selecting models for use in deployment system 1406, for selecting models for training, or retraining, in training system 1404, and/or for otherwise interacting with training system 1404.

In at least one embodiment, pipeline manager 1512 may be used, in addition to an application orchestration system 1528, to manage interaction between applications or containers of deployment pipeline(s) 1510 and services 1420 and/or hardware 1422. In at least one embodiment, pipeline manager 1512 may be configured to facilitate interactions from application to application, from application to service 1420, and/or from application or service to hardware 1422. In at least one embodiment, although illustrated as included in software 1418, this is not intended to be limiting, and in some examples (e.g., as illustrated in FIG. 12*cc*) pipeline manager 1512 may be included in services 1420. In at least one embodiment, application orchestration system 1528 (e.g., Kubernetes, DOCKER, etc.) may include a container orchestration system that may group applications into containers as logical units for coordination, management, scaling, and deployment. In at least one embodiment, by associating applications from deployment pipeline(s) 1510 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1512 and application orchestration system 1528. In at least one embodiment, so long as an expected input and/or output of each container or application is known by a system (e.g., based on constructs of applications or containers), application orchestration system 1528 and/or pipeline manager 1512 may facilitate communication among and between, and sharing of resources among and between, each of applications or containers. In at least one embodiment, because one or more of applications or containers in deployment pipeline(s) 1510 may share same services and resources, application orchestration system 1528 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1528) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1420 leveraged by and shared by applications or containers in deployment system 1406 may include compute services 1516, AI services 1518, visualization services 1520, and/or other service types. In at least one embodiment, applications may call (e.g., execute) one or more of services 1420 to perform processing operations for an application. In at least one embodiment, compute services 1516 may be leveraged by applications to perform super-computing or other high-performance computing (HPC) tasks. In at least one embodiment, compute service(s) 1516 may be leveraged to perform parallel processing (e.g., using a parallel computing platform 1530) for processing data through one or more of applications and/or one or more tasks of a single application, substantially simultaneously. In at least one embodiment, parallel computing platform 1530 (e.g., NVIDIA's CUDA) may enable general purpose computing on GPUs (GPGPU) (e.g., GPUs 1522). In at least one embodiment, a software layer of parallel computing platform 1530 may provide access to virtual instruction sets and parallel computational elements of GPUs, for execution of compute kernels. In at least one embodiment, parallel computing platform 1530 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1530 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1518 may be leveraged to perform inferencing services for executing machine learning model(s) associated with applications (e.g., tasked with performing one or more processing tasks of an application). In at least one embodiment, AI services 1518 may leverage AI system 1524 to execute machine learning model(s) (e.g., neural networks, such as CNNs) for segmentation, reconstruction, object detection, feature detection, classification, and/or other inferencing tasks. In at least one embodiment, applications of deployment pipeline(s) 1510 may use one or more of output models 1416 from training system 1404 and/or other models of applications to perform inference on imaging data. In at least one embodiment, two or more examples of inferencing using application orchestration system 1528 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1528 may distribute resources (e.g., services 1420 and/or hardware 1422) based on priority paths for different inferencing tasks of AI services 1518.

In at least one embodiment, shared storage may be mounted to AI services 1518 within system 1500. In at least one embodiment, shared storage may operate as a cache (or other storage device type) and may be used to process inference requests from applications. In at least one embodiment, when an inference request is submitted, a request may be received by a set of API instances of deployment system 1406, and one or more instances may be selected (e.g., for best fit, for load balancing, etc.) to process a request. In at least one embodiment, to process a request, a request may be entered into a database, a machine learning model may be located from model registry 1424 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1512) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1420 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1526, and an inference service may perform inferencing on a GPU.

In at least one embodiment, visualization services 1520 may be leveraged to generate visualizations for viewing outputs of applications and/or deployment pipeline(s) 1510. In at least one embodiment, GPUs 1522 may be leveraged by visualization services 1520 to generate visualizations. In at least one embodiment, rendering effects, such as ray-tracing, may be implemented by visualization services 1520 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1520 may include an internal visualizer, cinematics, and/or other rendering or image processing capabilities or functionality (e.g., ray tracing, rasterization, internal optics, etc.).

In at least one embodiment, hardware 1422 may include GPUs 1522, AI system 1524, cloud 1526, and/or any other hardware used for executing training system 1404 and/or deployment system 1406. In at least one embodiment, GPUs 1522 (e.g., NVIDIA's TESLA and/or QUADRO GPUs) may include any number of GPUs that may be used for executing processing tasks of compute services 1516, AI services 1518, visualization services 1520, other services, and/or any of features or functionality of software 1418. For example, with respect to AI services 1518, GPUs 1522 may be used to perform pre-processing on imaging data (or other data types used by machine learning models), post-processing on outputs of machine learning models, and/or to perform inferencing (e.g., to execute machine learning models). In at least one embodiment, cloud 1526, AI system 1524, and/or other components of system 1500 may use GPUs 1522. In at least one embodiment, cloud 1526 may include a GPU-optimized platform for deep learning tasks. In at least one embodiment, AI system 1524 may use GPUs, and cloud 1526—or at least a portion tasked with deep learning or inferencing—may be executed using one or more AI systems 1524. As such, although hardware 1422 is illustrated as discrete components, this is not intended to be limiting, and any components of hardware 1422 may be combined with, or leveraged by, any other components of hardware 1422.

In at least one embodiment, AI system 1524 may include a purpose-built computing system (e.g., a super-computer or an HPC) configured for inferencing, deep learning, machine learning, and/or other artificial intelligence tasks. In at least one embodiment, AI system 1524 (e.g., NVIDIA's DGX) may include GPU-optimized software (e.g., a software stack) that may be executed using a plurality of GPUs 1522, in addition to CPUs, RAM, storage, and/or other components, features, or functionality. In at least one embodiment, one or more AI systems 1524 may be implemented in cloud 1526 (e.g., in a data center) for performing some or all of AI-based processing tasks of system 1500.

In at least one embodiment, cloud 1526 may include a GPU-accelerated infrastructure (e.g., NVIDIA's NGC) that may provide a GPU-optimized platform for executing processing tasks of system 1500. In at least one embodiment, cloud 1526 may include an AI system(s) 1524 for performing one or more of AI-based tasks of system 1500 (e.g., as a hardware abstraction and scaling platform). In at least one embodiment, cloud 1526 may integrate with application orchestration system 1528 leveraging multiple GPUs to enable seamless scaling and load balancing between and among applications and services 1420. In at least one embodiment, cloud 1526 may tasked with executing at least some of services 1420 of system 1500, including compute services 1516, AI services 1518, and/or visualization services 1520, as described herein. In at least one embodiment, cloud 1526 may perform small and large batch inference (e.g., executing NVIDIA's TENSOR RT), provide an accelerated parallel computing API and platform 1530 (e.g., NVIDIA's CUDA), execute application orchestration system 1528 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1500.

Figure 16A:
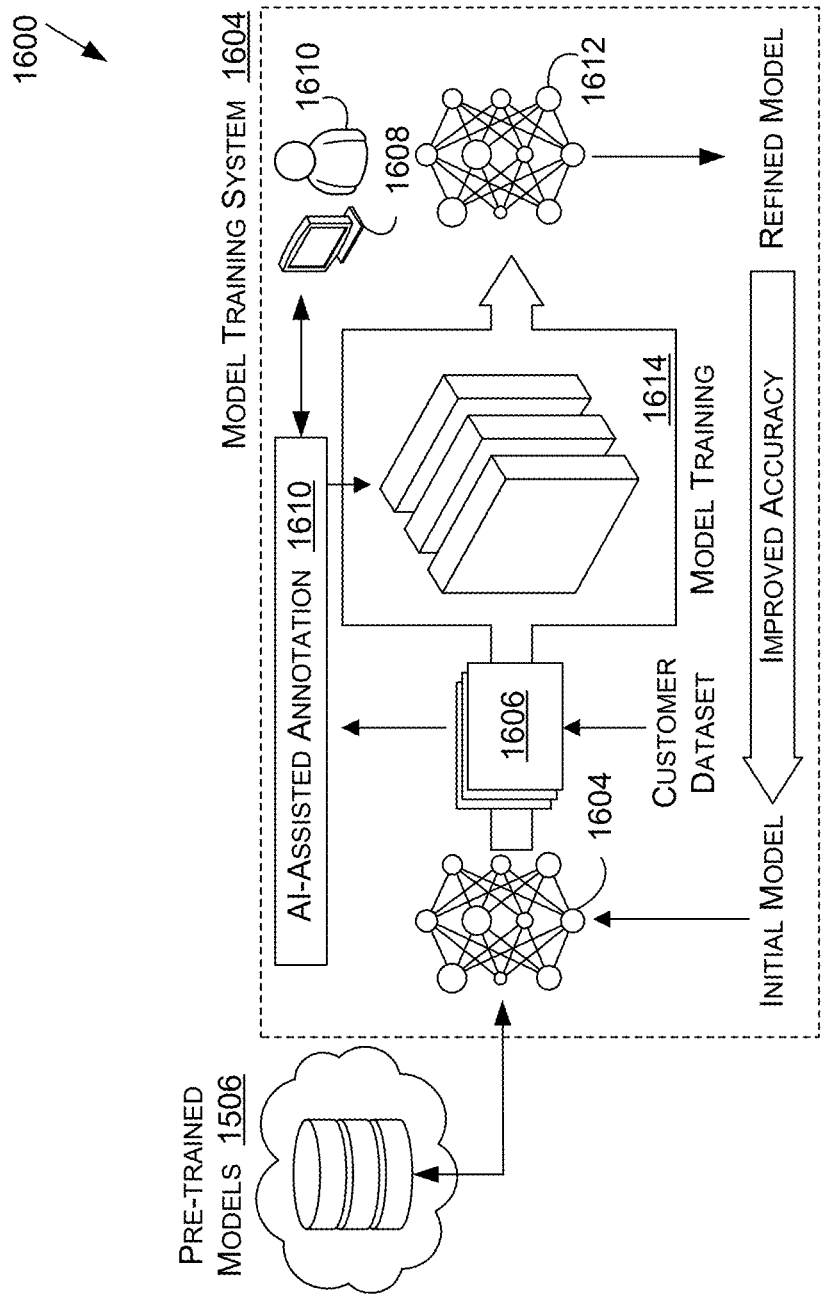
FIGS. 16A and 16B illustrate a data flow diagram for a process to train a machine learning model, as well as client-server architecture to enhance annotation tools with pre-trained annotation models, in accordance with at least one embodiment.

FIG. 16A illustrates a data flow diagram for a process 1600 to train, retrain, or update a machine learning model, in accordance with at least one embodiment. In at least one embodiment, process 1600 may be executed using, as a non-limiting example, system 1500 of FIG. 15. In at least one embodiment, process 1600 may leverage services and/or hardware as described herein. In at least one embodiment, refined models 1612 generated by process 1600 may be executed by a deployment system for one or more containerized applications in deployment pipelines.

In at least one embodiment, model training 1614 may include retraining or updating an initial model 1604 (e.g., a pre-trained model) using new training data (e.g., new input data, such as customer dataset 1606, and/or new ground truth data associated with input data). In at least one embodiment, to retrain, or update, initial model 1604, output or loss layer(s) of initial model 1604 may be reset, or deleted, and/or replaced with an updated or new output or loss layer(s). In at least one embodiment, initial model 1604 may have previously fine-tuned parameters (e.g., weights and/or biases) that remain from prior training, so training or retraining 1614 may not take as long or require as much processing as training a model from scratch. In at least one embodiment, during model training 1614, by having reset or replaced output or loss layer(s) of initial model 1604, parameters may be updated and re-tuned for a new data set based on loss calculations associated with accuracy of output or loss layer(s) at generating predictions on new, customer dataset 1606.

In at least one embodiment, pre-trained models 1606 may be stored in a data store, or registry. In at least one embodiment, pre-trained models 1606 may have been trained, at least in part, at one or more facilities other than a facility executing process 1600. In at least one embodiment, to protect privacy and rights of patients, subjects, or clients of different facilities, pre-trained models 1606 may have been trained, on-premise, using customer or patient data generated on-premise. In at least one embodiment, pre-trained models 1406 may be trained using a cloud and/or other hardware, but confidential, privacy protected patient data may not be transferred to, used by, or accessible to any components of a cloud (or other off premise hardware). In at least one embodiment, where a pre-trained model 1606 is trained at using patient data from more than one facility, pre-trained model 1606 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1606 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1606 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1604 for a training system within process 1600. In at least one embodiment, a customer dataset 1606 (e.g., imaging data, genomics data, sequencing data, or other data types generated by devices at a facility) may be used to perform model training (which may include, without limitation, transfer learning) on initial model 1604 to generate refined model 1612. In at least one embodiment, ground truth data corresponding to customer dataset 1606 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1610 may interact with a GUI via computing device 1608 to edit or fine-tune (auto)annotations. In at least one embodiment, a polygon editing feature may be used to move vertices of a polygon to more accurate or fine-tuned locations.

In at least one embodiment, once customer dataset 1606 has associated ground truth data, ground truth data (e.g., from AI-assisted annotation, manual labeling, etc.) may be used by during model training to generate refined model 1612. In at least one embodiment, customer dataset 1606 may be applied to initial model 1604 any number of times, and ground truth data may be used to update parameters of initial model 1604 until an acceptable level of accuracy is attained for refined model 1612. In at least one embodiment, once refined model 1612 is generated, refined model 1612 may be deployed within one or more deployment pipelines at a facility for performing one or more processing tasks with respect to medical imaging data.

In at least one embodiment, refined model 1612 may be uploaded to pre-trained models in a model registry to be selected by another facility. In at least one embodiment, his process may be completed at any number of facilities such that refined model 1612 may be further refined on new datasets any number of times to generate a more universal model.

Figure 16B:
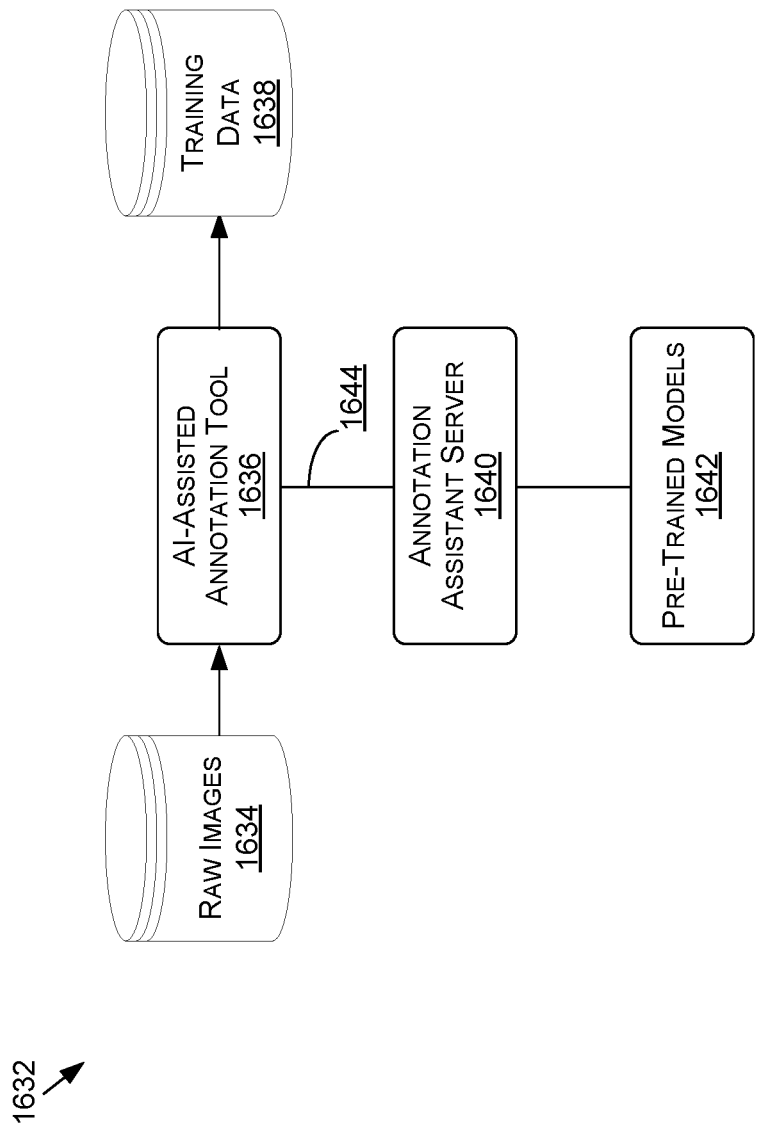

FIG. 16B is an example illustration of a client-server architecture 1632 to enhance annotation tools with pre-trained annotation models, in accordance with at least one embodiment. In at least one embodiment, AI-assisted annotation tools 1636 may be instantiated based on a client-server architecture 1632. In at least one embodiment, annotation tools 1636 in imaging applications may aid radiologists, for example, identify organs and abnormalities. In at least one embodiment, imaging applications may include software tools that help user 1610 to identify, as a non-limiting example, a few extreme points on a particular organ of interest in raw images 1634 (e.g., in a 3D MRI or CT scan) and receive auto-annotated results for all 2D slices of a particular organ. In at least one embodiment, results may be stored in a data store as training data 1638 and used as (for example and without limitation) ground truth data for training. In at least one embodiment, when computing device 1608 sends extreme points for AI-assisted annotation, a deep learning model, for example, may receive this data as input and return inference results of a segmented organ or abnormality. In at least one embodiment, pre-instantiated annotation tools, such as AI-Assisted Annotation Tool 1636B in FIG. 16B, may be enhanced by making API calls (e.g., API Call 1644) to a server, such as an Annotation Assistant Server 1640 that may include a set of pre-trained models 1642 stored in an annotation model registry, for example. In at least one embodiment, an annotation model registry may store pre-trained models 1642 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
   determining, based at least on a request received at an endpoint of a plurality of endpoints of a system of two or more communicatively coupled computing devices, a natural language text string associated with the request;
   determining, based at least on the natural language text string and a task associated with the endpoint, one or more guidance mechanisms associated with the request;
   processing, using a large language model and based at least on the one or more guidance mechanisms, the natural language text string to generate a text result corresponding to the request, wherein the large language model was not trained to perform at least a subset of one or more tasks associated with at least one endpoint of the plurality of endpoints; and
   generating, using the endpoint, a response to the request, the response including at least the text result.

2. The method of claim 1, wherein individual endpoints of the plurality of endpoints are associated with one or more respective tasks.

3. The method of claim 2, further comprising:
   selecting, for individual endpoints of the plurality of endpoints, a respective set of one or more guidance mechanisms for the respective task of the individual endpoint.

4. The method of claim 1, wherein the one or more guidance mechanisms includes a prompt token indicating at least one of a type of inferencing to be performed for the task or a type of result to be returned for the task.

5. The method of claim 1, wherein the one or more guidance mechanisms includes a retrieval set tag indicating one or more datasets to reference, wherein the result is further generated based at least on using the language model to process data retrieved from the one or more datasets based at least on the retrieval set tag.

6. The method of claim 1, wherein the one or more guidance mechanisms includes an adaptor weight to modify at least one of a network weight or a layer structure of the language model prior to the processing.

7. The method of claim 1, further comprising:
generating one or more alphanumeric strings representative of the one or more guidance mechanisms; and
prepending the one or more alphanumeric strings to the natural language text string to form a modified text string,
wherein the processing the natural language text string includes processing the modified text string.

8. The method of claim 1, further comprising:
generating, using one or more endpoints of the plurality of endpoints, a plurality of text strings for a plurality of tasks to be performed using the large language model; and
transmitting the plurality of text strings as at least one of: one or more batches or a combined homogeneous task stream.

9. The method of claim 1, wherein the large language model is associated with two or more model instances of different sizes, and wherein the endpoint is trained with respect to a specified model instance of the two or more model instances to perform the task.

10. The method of claim 1, wherein the natural language text string is obtained from the request according to one or more marshalling rules used to configure the endpoint.

11. At least one processor, comprising:
one or more circuits to cause the at least one processor to perform operations comprising:
determining, based at least on a request received at an endpoint of a plurality of endpoints of a system of two or more communicatively coupled computing devices, a natural language text string associated with the request;
determining, based at least on the natural language text string and a task associated with the endpoint, one or more guidance mechanisms associated with the request;
processing, using a large language model and based at least on the one or more guidance mechanisms, the natural language text string to generate a text result corresponding to the request, wherein the large language model was not trained to perform at least a subset of one or more tasks associated with at least one of the plurality of endpoints; and
generating, using the endpoint, a response to the request, the response including at least the text result.

12. The at least one processor of claim 11, wherein individual endpoints of the plurality of endpoints are associated with one or more respective tasks.

13. The at least one processor of claim 12, wherein the operations further comprise selecting, for individual endpoints of the plurality of endpoints, a respective set of one or more guidance mechanisms for the respective task of the individual endpoint.

14. The at least one processor of claim 12, wherein the operations further comprise:
generating one or more alphanumeric strings representative of the one or more guidance mechanisms; and
prepending the one or more alphanumeric strings to the natural language text string to form a modified text string,
wherein the processing the natural language text string includes processing the modified text string.

15. The at least one processor of claim 11, wherein the large language model is associated with two or more model instances of different sizes, and wherein the endpoint is trained with respect to a specified model instance of the two or more model instances to perform the task.

16. The at least one processor of claim 11, wherein the at least one processor is comprised in at least one of:
a system for performing simulation operations;
a system for performing simulation operations to test or validate autonomous machine applications;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

17. A system, comprising:
one or more processors to generate a response to a request according to a response format associated with an endpoint corresponding to the request, the response being generated based at least on a language model performing inferencing according to one or more guidance mechanisms determined to be associated with the response format.

18. The system of claim 17, wherein the one or more guidance mechanisms include at least one of a prompt token, a retrieval tag set, or an adaptor weight.

19. The system of claim 17, wherein the one or more guidance mechanisms are used to perform at least one of:
altering one or more weights of at least one layer of the language model,
altering a structure of one or more layers of the language model,
updating an input to the language model corresponding to the request, or
providing an indication of a data set to access for retrieving data corresponding to the input to the language model.

20. The system of claim 17, wherein the system comprises at least one of:
a system for performing simulation operations;
a system for performing simulation operations to test or validate autonomous machine applications;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;

a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

* * * * *